US010600352B1

(12) United States Patent
Wheelwright et al.

(10) Patent No.: US 10,600,352 B1
(45) Date of Patent: Mar. 24, 2020

(54) DISPLAY DEVICE WITH A SWITCHABLE WINDOW AND SEE-THROUGH PANCAKE LENS ASSEMBLY

(71) Applicant: FACEBOOK TECHNOLOGIES, LLC, Menlo Park, CA (US)

(72) Inventors: Brian Wheelwright, Sammamish, WA (US); Jacques Gollier, Bellevue, WA (US); Ying Geng, Bellevue, WA (US); Yusufu Njoni Bamaxam Sulai, Bothell, WA (US); Fenglin Peng, Redmond, WA (US); Babak Amirsolaimani, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/209,909

(22) Filed: Dec. 4, 2018

(51) Int. Cl.
*G09G 3/22* (2006.01)
*G02B 27/00* (2006.01)
*G02B 27/01* (2006.01)
*G02B 27/14* (2006.01)
*G02B 5/30* (2006.01)
*G03H 1/02* (2006.01)
*G06F 3/01* (2006.01)

(52) U.S. Cl.
CPC ............. *G09G 3/22* (2013.01); *G02B 5/3025* (2013.01); *G02B 27/0025* (2013.01); *G02B 27/0172* (2013.01); *G02B 27/14* (2013.01); *G03H 1/0248* (2013.01); *G06F 3/013* (2013.01); *G09G 2360/144* (2013.01)

(58) Field of Classification Search
CPC ............... G09G 3/22; G09G 2360/144; G09G 2360/14; G02B 5/3025; G02B 27/14; G02B 27/0025; G02B 27/0172; G03H 1/0248
See application file for complete search history.

(56) References Cited

U.S. PATENT DOCUMENTS

| 9,223,152 | B1* | 12/2015 | Kress | G01J 1/4204 |
| 2013/0113973 | A1* | 5/2013 | Miao | G09G 3/003 |
| | | | | 348/333.01 |
| 2014/0247500 | A1* | 9/2014 | Takeda | G02B 27/0172 |
| | | | | 359/631 |
| 2015/0234477 | A1* | 8/2015 | Abovitz | G06F 3/017 |
| | | | | 382/103 |
| 2017/0307890 | A1* | 10/2017 | Wang | G02C 7/022 |
| 2018/0017791 | A1* | 1/2018 | Beckman | G02B 27/01 |

(Continued)

*Primary Examiner* — Ryan A Lubit
(74) *Attorney, Agent, or Firm* — Morgan, Lewis & Bockius LLP

(57) ABSTRACT

A display device is configured to be operable in a normal mode that blocks ambient light or a see-through mode that allows ambient light to be visible to a user. The display device includes an emission surface configured to output image light, a switchable window configurable to block ambient light in the normal mode or to transmit ambient light in the see-through mode, and an optical assembly. The optical assembly includes a first region configured to receive image light from the emission surface and to direct the image light toward the eyes of a user. The optical assembly also includes a second region configured to receive ambient light from the switchable window and to allow at least a portion of the ambient light to pass through. A method of setting the display device in normal mode or see-through mode is also disclosed.

21 Claims, 29 Drawing Sheets

(56) References Cited

U.S. PATENT DOCUMENTS

| | | | |
|---|---|---|---|
| 2019/0064526 A1* | 2/2019 | Connor | G02B 27/0172 |
| 2019/0187474 A1* | 6/2019 | Bhargava | G02B 27/0172 |
| 2019/0271844 A1* | 9/2019 | Kress | G02B 27/0172 |

* cited by examiner

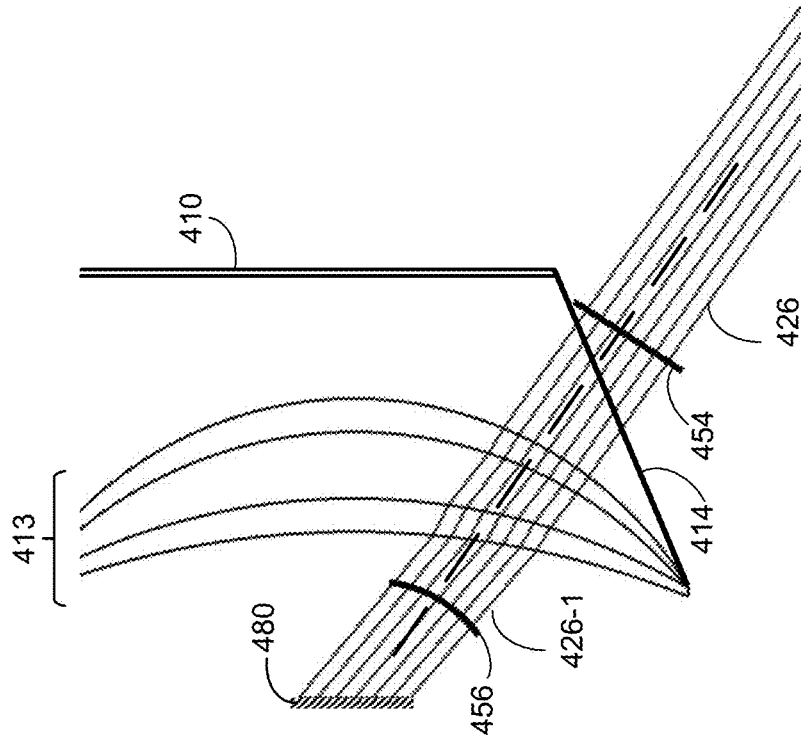
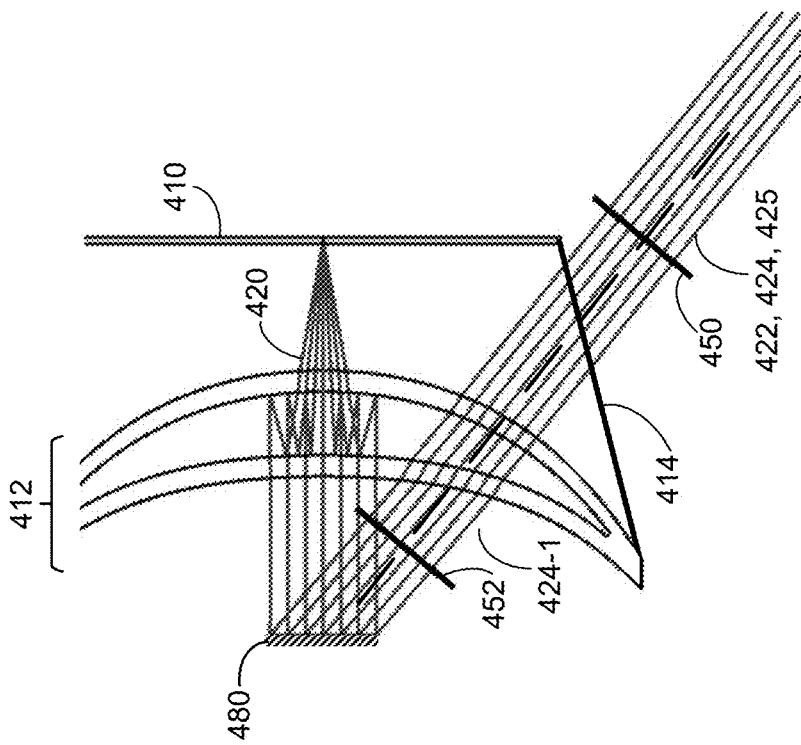
Figure 4E
Figure 4D

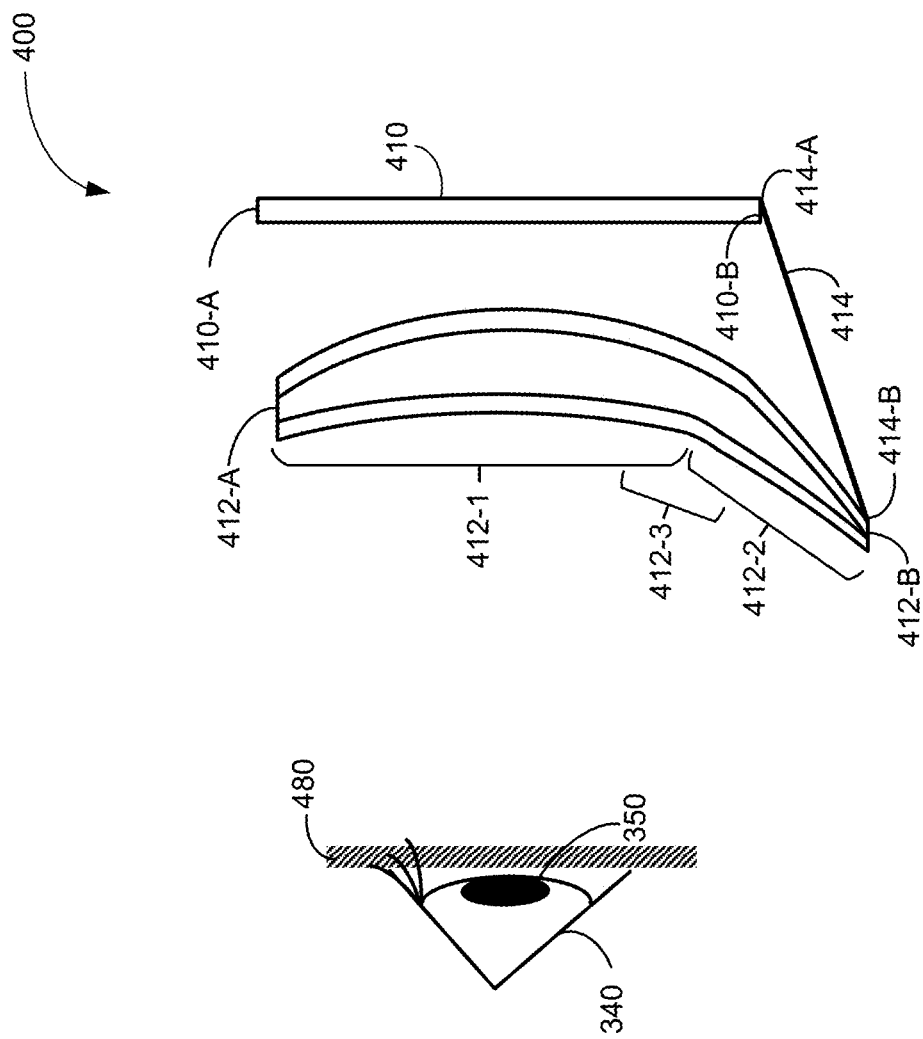

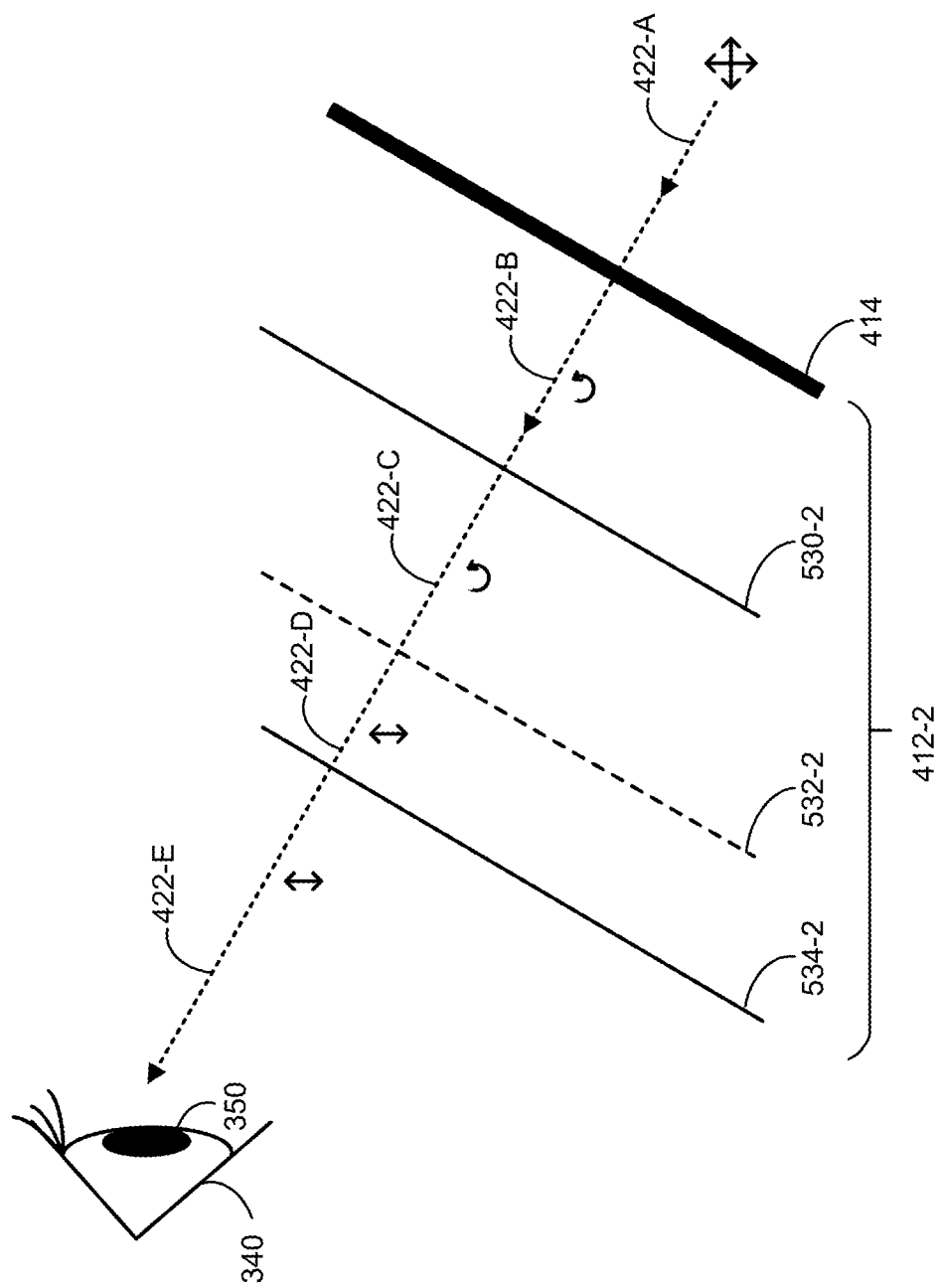

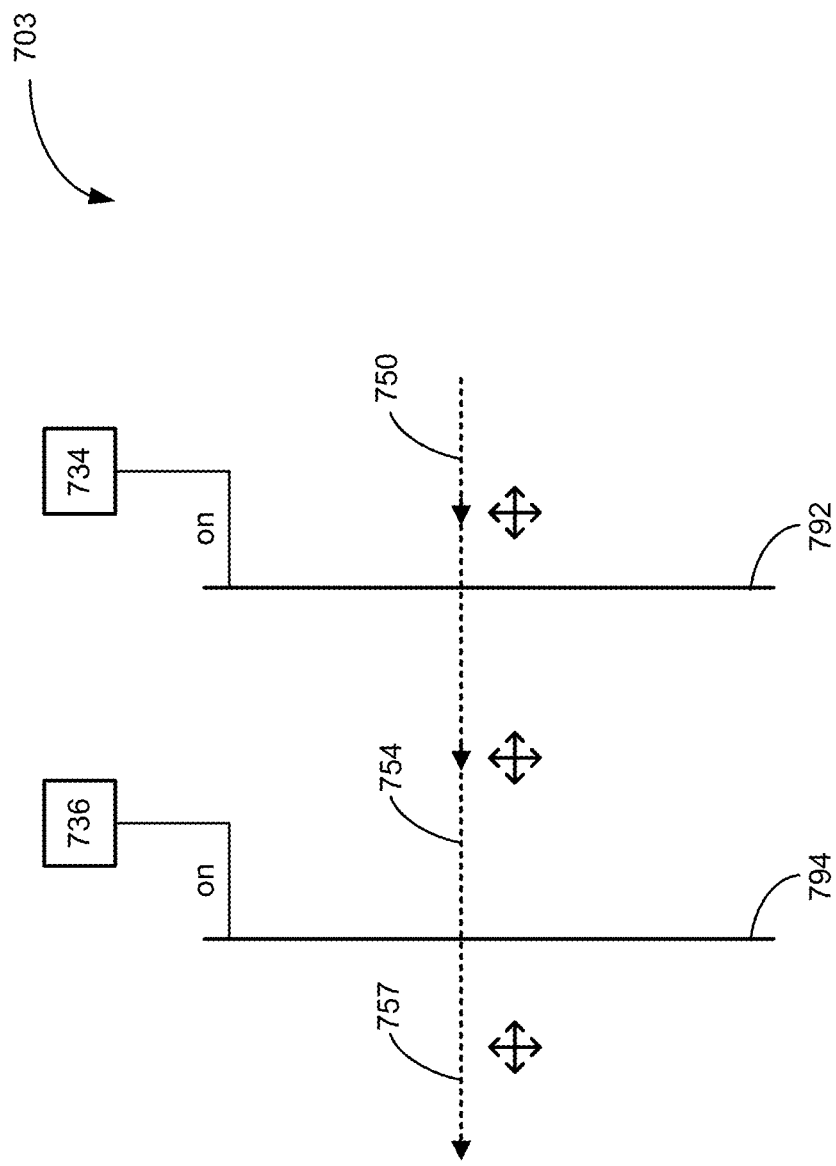

DISPLAY DEVICE WITH A SWITCHABLE WINDOW AND SEE-THROUGH PANCAKE LENS ASSEMBLY

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality and augmented reality operations.

When using head-mounted display devices, it can be desirable to block out external or ambient light from entering a user's eyes in order to provide a fully immersive experience. However, in some circumstances, it may be desirable for the user to be able to observe the outside environment while using the head-mounted display device. For instance, a user may want to look down at his or her hands in order to view a keyboard, mouse, or controller, or to do things like grabbing a cup of tea, while using the head-mounted display device without having to remove the head-mounted display device.

SUMMARY

Accordingly, there is a need for a head-mounted display device that allows switching (either manually or automatically) between a normal mode in which a user can view displayed images without interference from external or ambient light and a see-through mode where the user may view the outside environment without taking off or turning off the head-mounted display.

Thus, the above deficiencies and other problems associated with conventional head-mounted displays are reduced or eliminated by the disclosed display devices.

In accordance with some embodiments, a display device is configured to be operable in either one of a first mode and a second mode. The display device includes an emission surface configured to output image light, a switchable window configurable to block ambient light from outside the display device in the first mode and to transmit ambient light in the second mode, and an optical assembly. The optical assembly has a first region configured to receive image light from the emission surface and to direct the image light with a first optical power, and a second region configured to receive the ambient light from the switchable window in the second mode and to allow at least a portion of the received ambient light to pass through with a second optical power distinct from and less than the first optical power.

In accordance with some embodiments, a method of operating a display device that is mounted near the eyes of a user includes detecting a location and a gaze direction of the eyes of the user, generating image light, directing the image light toward the eyes of the user with a first optical power, and setting the display device in one of the first mode or the second mode based on the gaze direction of the eyes of the user. In the first mode, ambient light from outside the display device is blocked from entering the display device. In the second mode, ambient light from outside the display device is transmitted towards the eyes of the user with a second optical power distinct from and less than the first optical power.

Thus, the disclosed embodiments provide a display device capable of switching between a normal mode and a see-through mode to selectively allow external or ambient light to enter the eyes of a user.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 4D-4E show the optical paths of light in a display device in accordance with some embodiments.

FIG. 4F illustrates a display device in accordance with some embodiments.

FIGS. 6A-6D illustrate polarization along the optical path of light in an optical assembly in accordance with some embodiments.

FIGS. 7A-7J illustrate the optical path of light in a switchable window in accordance with some embodiments.

Figure 1:
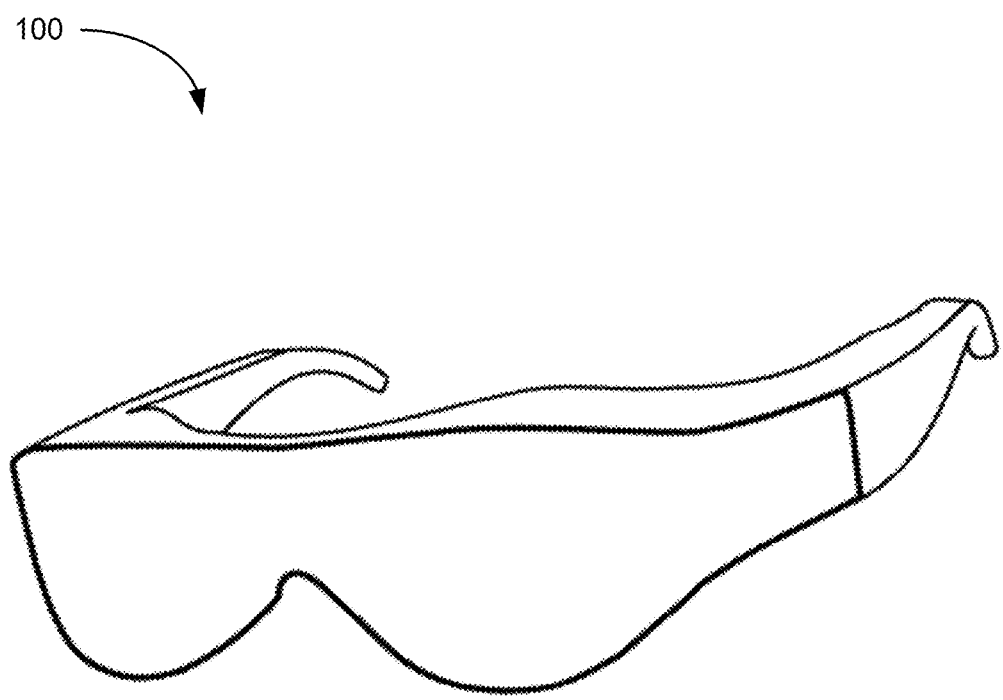
FIG. 1 is a perspective view of a display device in accordance with some embodiments.

These figures are not drawn to scale unless indicated otherwise.

DETAILED DESCRIPTION

The present disclosure provides a head-mounted display device (or display device) that allows switching between a normal mode in which external or ambient light is blocked from entering the head-mounted display and a see-through mode in which the head-mounted display is configured to transmit external or ambient light to a viewer. In some embodiments, the external or ambient light is transmitted to the viewer without significant optical aberrations from the optical components of the display device, in order to allow the user of the display device to accurately perceive and interact with objects in the outside environment.

In some embodiments, the display device is set in the see-through mode or normal mode based on a gaze direction of the user's eyes (e.g., when an eye-tracking module determines that the user's eyes are gazing towards a periphery of the user's field or view or a periphery of the display device, the display device is set in see-through mode). A method of operating the display device is also disclosed herein.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates a perspective view of display device 100 in accordance with some embodiments. In some embodiments, display device 100 is configured to be worn on a head of a user (e.g., by having the form of spectacles or eyeglasses, as shown in FIG. 1, or to be included as part of a helmet that is to be worn by the user). When display device 100 is configured to be worn on a head of a user, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed-reality contents, or any combination thereof) to a user.

Figure 2:
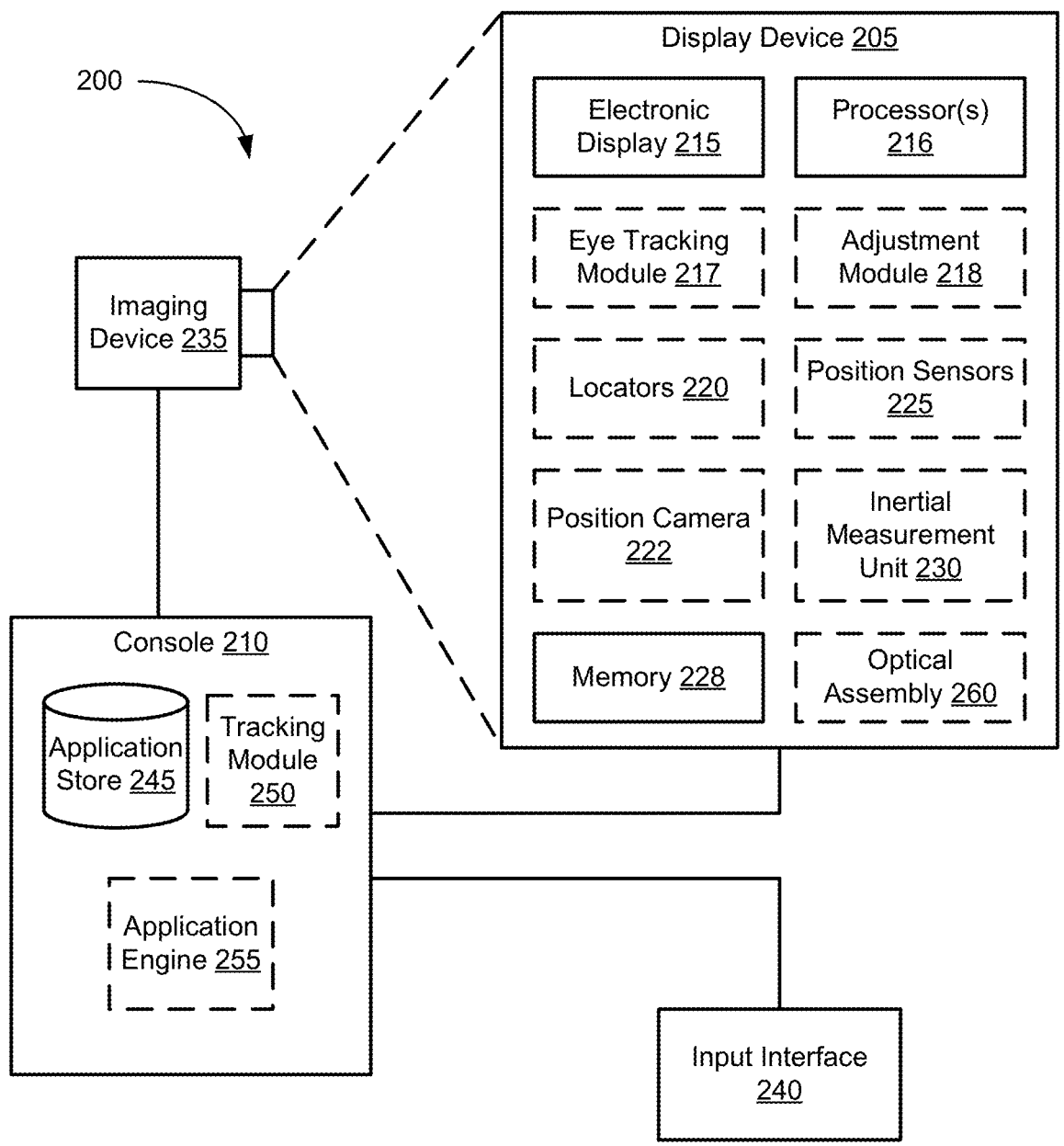
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed-reality by adding in a view of the real surroundings. Thus, display device 205 and system 200 described here can deliver augmented reality, virtual reality, and mixed-reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox. An eyebox is a region that is occupied by an eye of a user of display device 205 (e.g., a user wearing display device 205) who is viewing images from display device 205. In some embodiments, the eyebox is represented as a 10 mm×10 mm square. In some embodiments, the one or more optical components include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display 215 projects computer-generated images to one or more reflective elements (not shown), and the one or more optical assemblies 260 receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
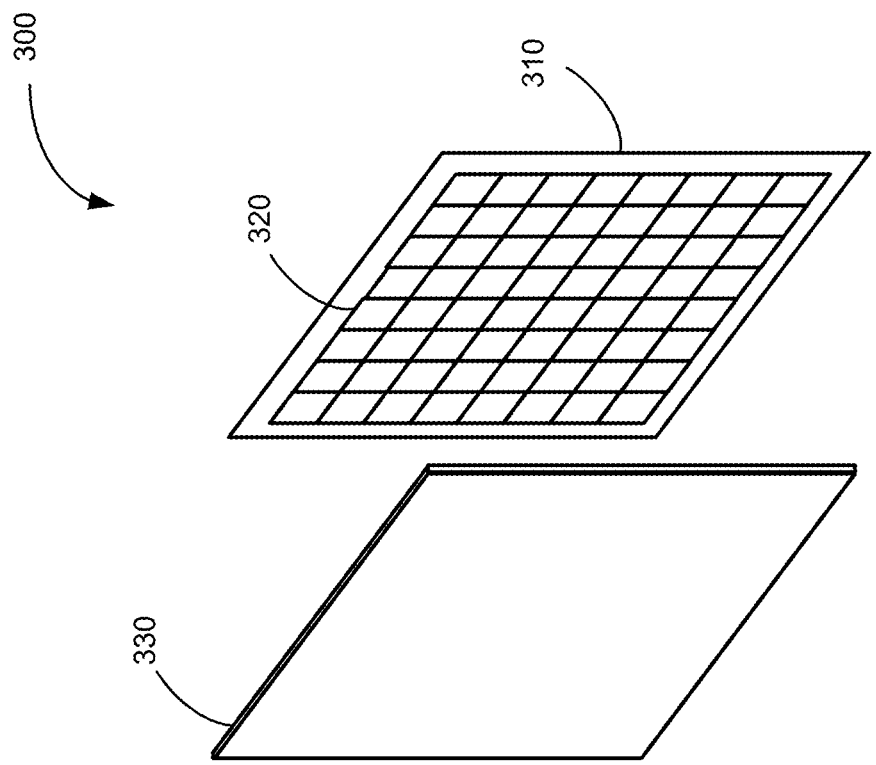
FIG. 3 is an isometric view of a display device in accordance with some embodiments.
Figure 3:
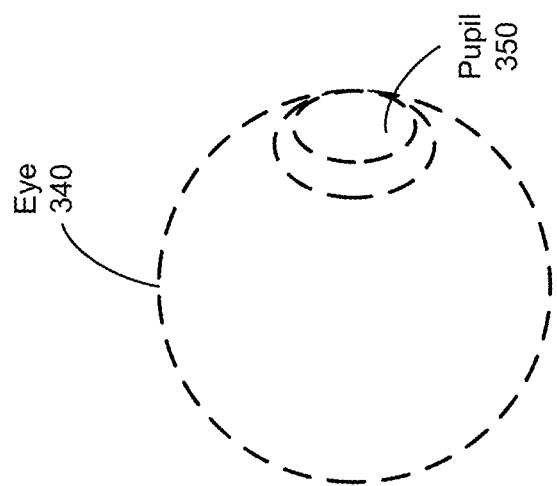

FIG. 3 is an isometric view of a display device 300, which corresponds to part of or all of display device 100 (see FIG. 1) in accordance with some embodiments. In some embodiments, display device 300 includes an emission surface 310 (e.g., a light emission device array or reflective element), and an optical assembly (e.g., optical assembly 260) having one or more optical components 330 (e.g., lenses). In some embodiments, display device 300 also includes an IR detector array.

In some embodiments, light emission device array 310 emits image light and optional IR light toward the optical components 330. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more optical components 330. In some embodiments, display device 300 uses an emission intensity array to facilitate providing image light to a location of pupil 350 of eye 340 of a user, and minimize the amount of image light provided to other areas in the eyebox.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more optical components 330 toward the determined location of pupil 350, and not toward another presumed location.

In some embodiments, display device 300 includes one or more broadband sources (e.g., one or more white LEDs) coupled with a plurality of color filters, in addition to, or instead of, light emission device array 310.

One or more optical components 330 receive the image light (or modified image light, e.g., attenuated light) from emission surface 310, and direct the image light to a detected or presumed location of the pupil 350 of an eye 340 of a user. In some embodiments, the one or more optical components include one or more optical assemblies 260.

Figure 4A:
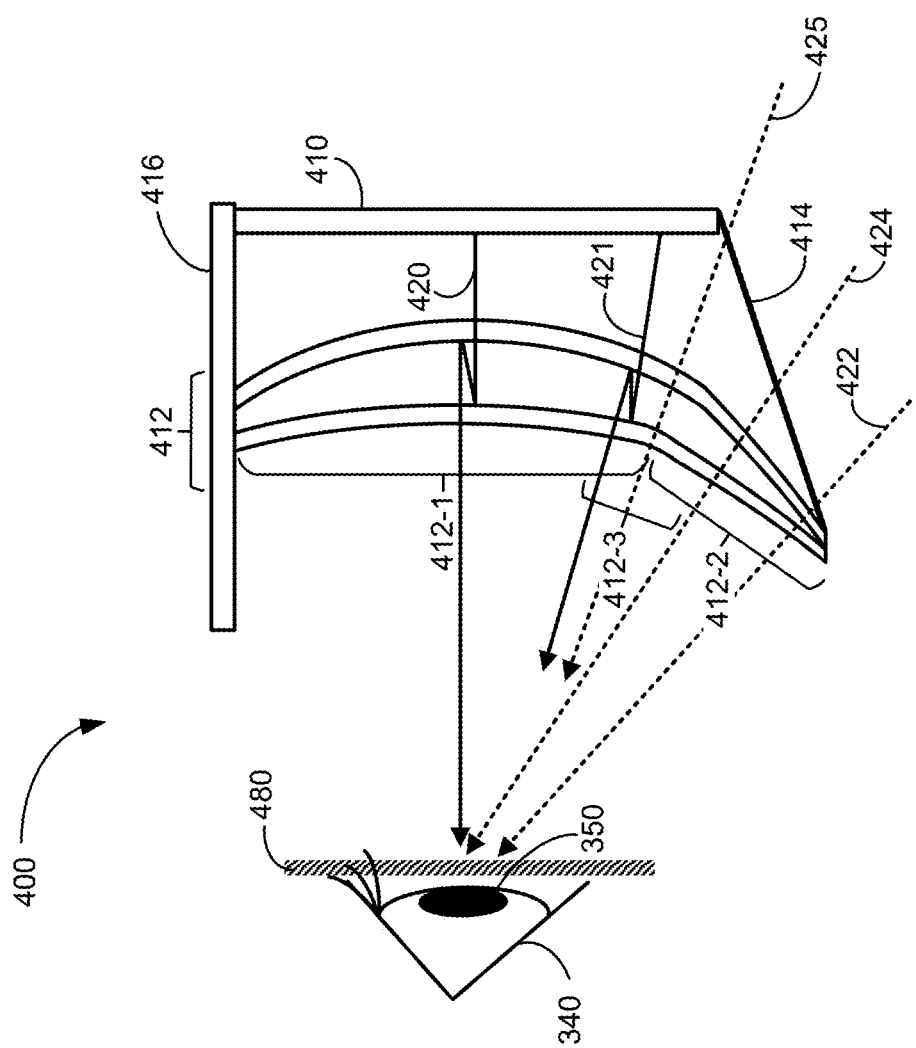
FIGS. 4A-4C illustrate a display device in accordance with some embodiments.

FIG. 4A illustrates display device 400 in accordance with some embodiments. Display device 400 includes emission surface 410, switchable window 414, and optical assembly 412. In some embodiments, display device 400 may also include frame 416. In some embodiments, frame 416, emission surface 410, and switchable window 414 form a housing and define an interior space for display device 400. Optical assembly 412 is disposed inside the housing (e.g., in the interior space) between emission surface 410 and a user's eyes 340 (when the device is in use). In some embodiments, the shape and dimensions of frame 416 and optical assembly 412 are determined in order to avoid interference with a user's brow bone. In some embodiments, where display device 400 is a head-mounted display device, display device 400 corresponds to display device 100 shown in FIG. 1.

Figure 4C:
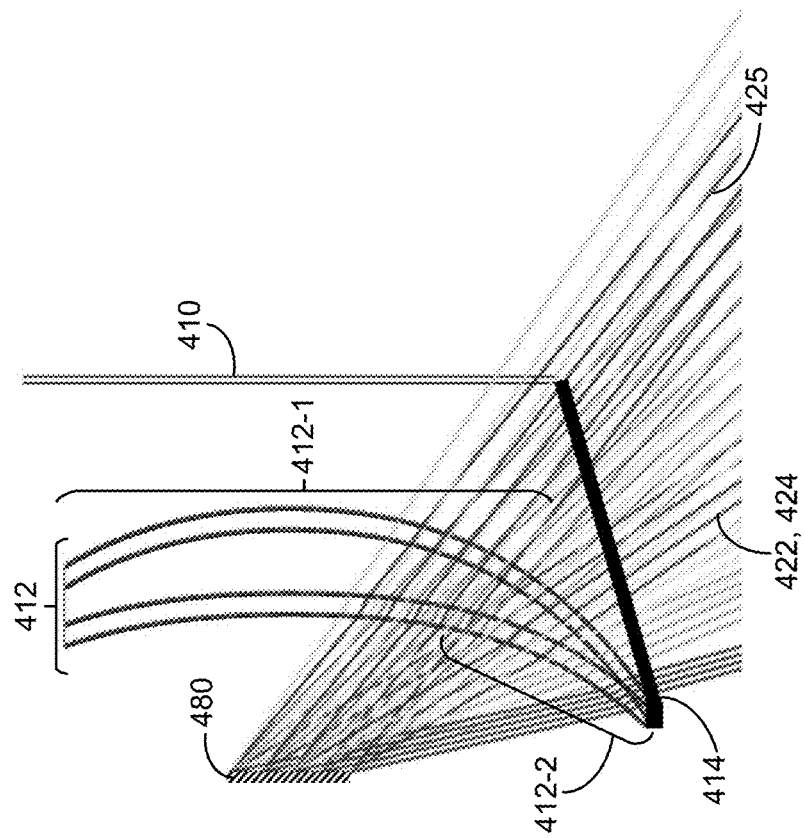
Figure 4B:
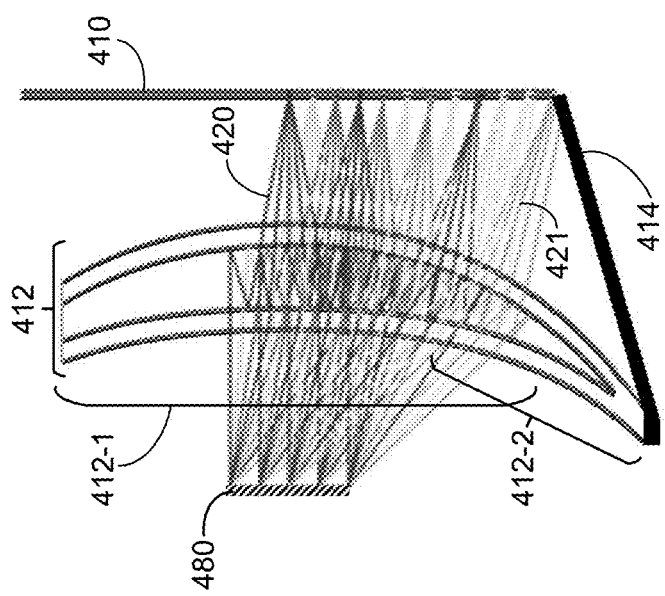

Emission surface 410 (e.g., a display surface or display element) is configured to output image light (e.g., rays 420 and 421). Optical assembly 412 includes one or more optical components (such as an optical retarder, a beam splitter, and/or a polarizing reflector). Optical assembly 412 has a first region 412-1 and a second region 412-2. The first region 412-1 of the optical assembly 412 is configured to direct image light (e.g., rays 420 and 421) via a folded optical path to an eyebox 480 or a pupil 350 of a user's eyes 340 with a first optical power. FIG. 4B shows the optical path of image light (e.g., rays 420 and 421) that is emitted from emission surface 410 and directed toward eyebox 480. In some embodiments, the first region 412-1 of the optical assembly 412 has surfaces that are curved (e.g., spherical or aspherical). The folded optical path is provided to increase field of view without increasing the physical distance between the display and the eye of the user or compromising image quality.

Switchable window 414 is configured to either block or allow transmission of external or ambient light (e.g., rays 422 and 424, light originating from outside the housing such as light from the environment outside the display device including off axis light). When display device 400 is in a see-through mode, at least a portion of external or ambient light (e.g., rays 424, 414, and 425) is transmitted through switchable window 414 into the interior space of the display device 400 shown in FIG. 4C. The second region 412-2 of the optical assembly is configured to transmit external or ambient light (e.g., rays 424, 414, and 425) toward eyebox 480 or the pupil 350 of the user's eyes 340 at a second optical power. In some embodiments, the second optical power is different from and less than the first optical power. In some embodiments, the second optical power is zero. In some embodiments, the second region 412-2 of optical assembly 412 is configured to reduce, minimize, or eliminate optical aberrations (e.g., optical power, focus, astigmatism, and/or distortion) in the external or ambient light (e.g., rays 422 and 424) as it is transmitted through the second region 412-2 of optical assembly 412 so that the user may have a proper view of the outside environment. In some embodiments, second region 412-2 of optical assembly 412 is configured to not add significant optical aberrations to the external or ambient light (including external or ambient light that are on-axis and including external or ambient light that are off-axis). In some embodiments, second region 412-2 of optical assembly 412 is also configured to transmit external or ambient light (e.g., rays 422 and 424) with zero or insignificant optical power (e.g., without adding optical power, or without any magnification). FIG. 4D shows the optical paths of ambient light (e.g., ray 424). As shown in FIG. 4D, one or more optical elements of optical assembly 412 has somewhat uniform thickness in the second region, allowing ambient light to be transmitted without introducing significant optical aberrations. As a result, ray 424 entering optical assembly 412 as a plane wave with a linear wavefront 450 would exit optical assembly 412 as ray 424-1 with a linear wavefront 452. In contrast, FIG. 4E shows optical assembly 413 that is similar to optical assembly 412 with the exception that optical assembly 413 includes one or more optical elements that do not have constant thickness, which may add optical aberrations to transmitted light (such as ray 426). As a result, ray 426 entering optical assembly 413 as a plane wave (with linear wavefront 454) would leave optical assembly 413 as ray 426-1, which is aberrated and is no longer a plane wave, evidenced by the non-linear (e.g., curved) wavefront 456.

In some embodiments, the first region 412-1 of optical assembly 412 and the second region 412-2 of optical assembly 412 may overlap with each other by a transition region 412-3, through which the user can receive either or both of the image light and the ambient light. Thus, in some embodiments, the first region 412-1 of optical assembly 412 and the second region 412-2 of optical assembly 412 are not mutually exclusive to one another. In some embodiments, the transition region 412-3 is between the first region 412-1 of optical assembly 412 and the second region 412-2 of optical assembly 412. In such cases, at least a portion of the user's field of view is capable of augmented reality (e.g., AR) applications. For example, a portion of a user's field of view that corresponds to the transition region 412-3 may receive image light (e.g., ray 421) from emission surface 410 as well as certain ambient light (e.g., ray 425). Thus, a portion of display device 400 is AR-capable. In some embodiments, the AR-capabilities of the transition region 412-3 may be used to blend the real world (e.g., from the see-through portion of display device 400) into the virtual world (e.g., one or more images displayed from emission source 410).

In some embodiments, display device 400 can be set to operate in see-through mode or normal mode based on a gaze direction of the user's eyes. For example, when eye-tracking module 217 determines that the user's eyes are gazing towards the second region 412-2 of optical assembly 412, display device 400 switches into or remains in see-through mode. When eye-tracking module 217 determines that the user's eyes are gazing towards the first region 412-1 of optical assembly 412 or emission surface 410, display device 400 switches into or remains in normal mode.

In some embodiments, when display device 400 is set to operate in normal mode, outside observers will see a black or reflective shield around the edges of display device 400. In some embodiments, when display device is set to operate in see-through mode, outside observers can see the user's face through the sides of display device 400. In such cases, display device 400 has the capability to provide an external cue (to external observers) as to whether the user is in a mixed-reality (e.g., augmented reality) environment or is immersed in a virtual reality environment.

FIG. 4F illustrates display device 400 in accordance with some embodiments. Optical assembly 412 has a first edge 412-A and an opposing second edge 412-B. The first region 412-1 of optical assembly 412 is adjacent to (e.g., touching or abutting) the first edge 412-A, while the second region 412-2 is adjacent to (e.g., touching or abutting) the second edge 412-B. Emission surface 410 has a first edge 410-A proximate to the first edge 412-A of optical assembly 412 and an opposing second edge 410-B. Switchable window has a first edge 414-A adjacent to (e.g., touching or abutting) the second edge 410-B of emission surface and a second edge 414-B adjacent to (e.g., touching or abutting) the second edge 412-B of optical assembly 412. In some embodiments, the first edge 410-A of emission surface 410 and the first edge 412-A of optical assembly 412 are both connected to the frame 416 (not shown in FIG. 4F). In some embodiments, the first region 412-1 of optical assembly 412 has a surface that is curved (e.g., spherical or aspherical). In some embodiments, the first region 412-1 of optical assembly 412 acts as a spherical lens or an aspheric lens to direct image light toward an eye of a user.

Figure 4H:
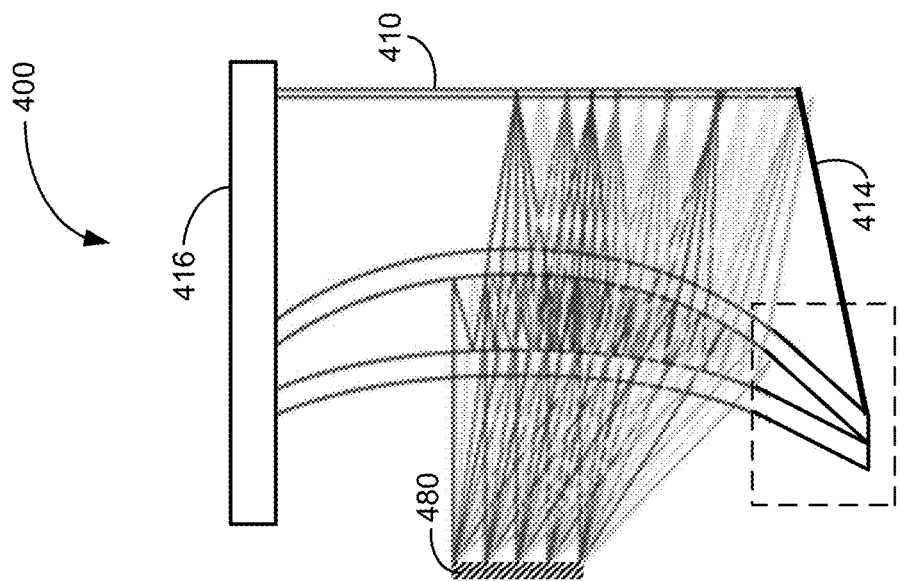
FIGS. 4G-4H illustrate exemplary examples of a display device in accordance with some embodiments.
Figure 4G:
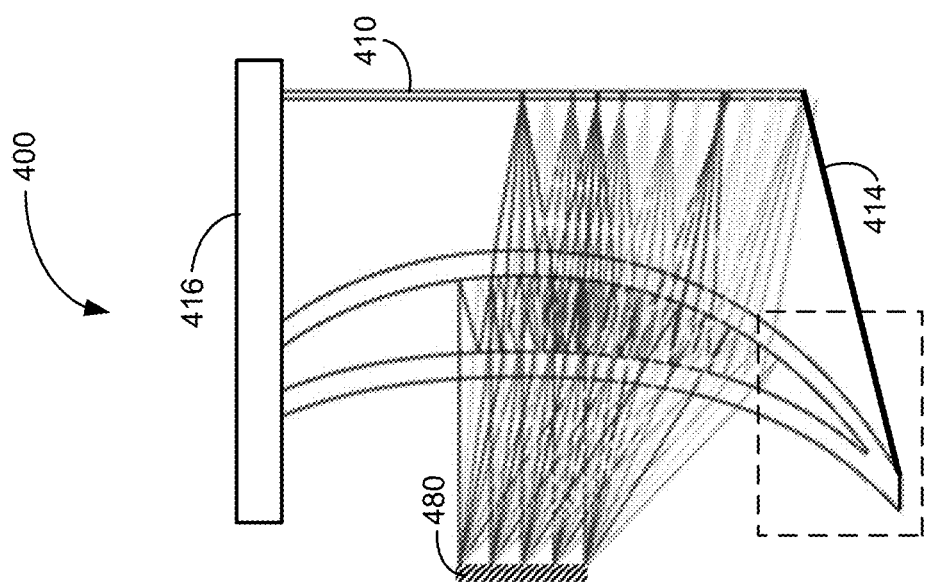

FIGS. 4G-4H illustrate exemplary examples of the second region 412-2 of optical assembly 412 in accordance with some embodiments. In some embodiments, as shown in the dashed box of FIG. 4H, some or all of the optical elements in the optical assembly 412 in the second region 412-2 have curved surfaces. In some embodiments, as shown in the dashed box of FIG. 4I, the surfaces of some or all of the optical elements in the optical assembly 412 transition from curved surfaces in the first region 412-1 to flat surfaces in the second region 412-2.

Figure 4I:
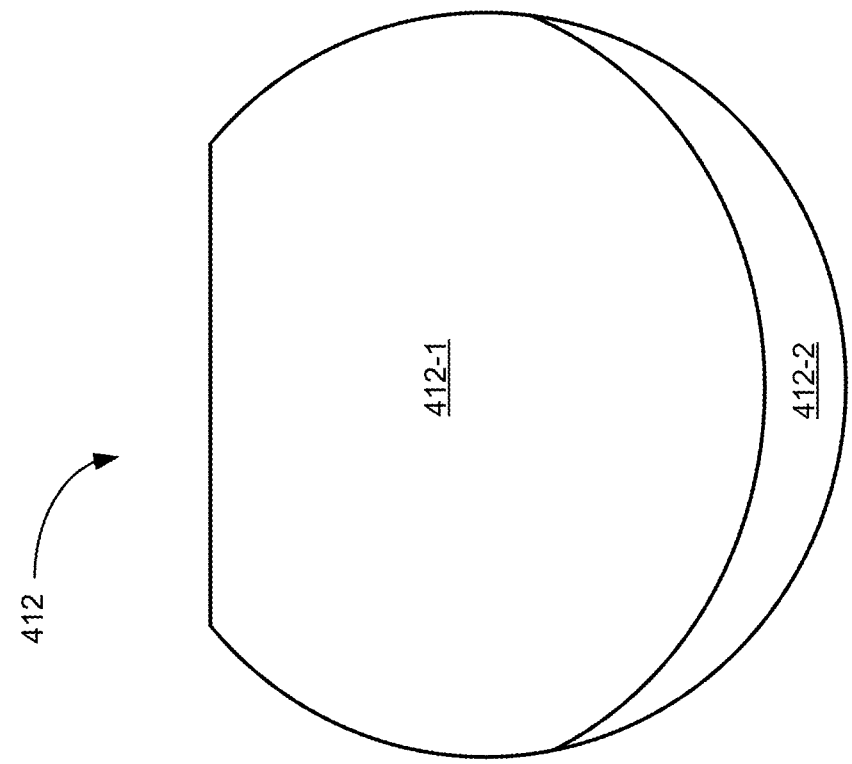
FIG. 4I illustrates a perspective view of an optical assembly of a display device in accordance with some embodiments.
Figure 4I:
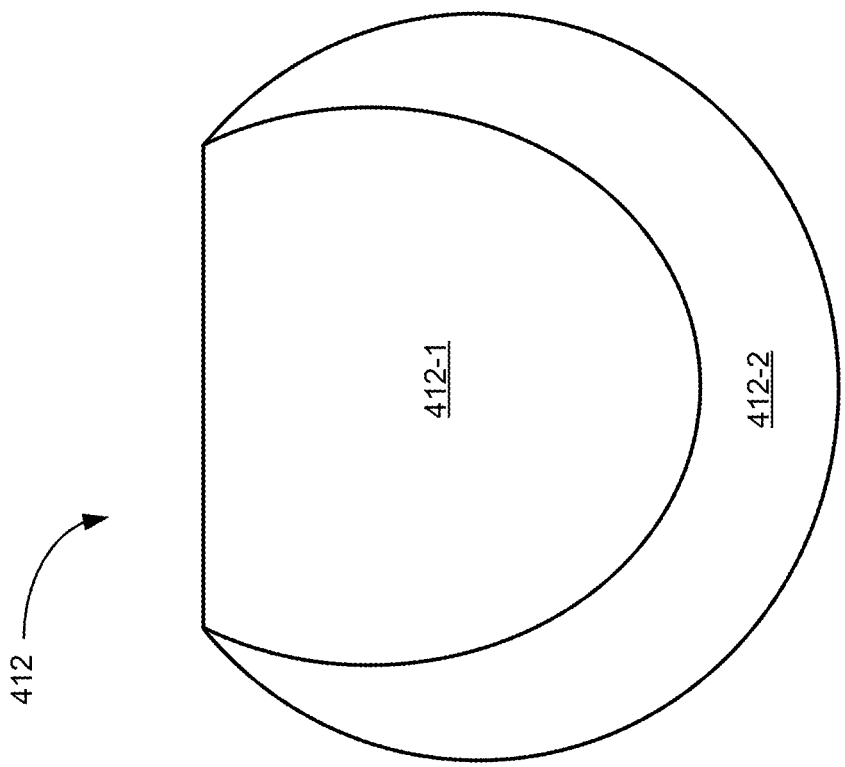

FIG. 4I illustrates a perspective view of optical assembly 412 of display device 400 from the eye 340 of a user in accordance with some embodiments. As shown in the left side of FIG. 4I, the second region 412-2 of optical assembly may surround at least a portion of the first region 412-1 of optical assembly 412. In such cases, display device 400 would allow the periphery of a user's field of view to be see-through capable. Although not shown, in such cases, switchable window 414 may extend and surround emission surface 410 (corresponding to the shape and location of second region 412-2 of optical assembly 412). For example, switchable window may include portions that are located to the left edge and/or the right edge of emission surface 410 as well as well as the second edge 410-B of emission surface 410.

In some embodiments, as shown in the right side of FIG. 4I, the second region 412-2 of optical assembly is underneath the first region 412-1 of optical assembly 412 and corresponds to a bottom portion of a field of view of the display device (e.g., when a user of the display device is gazing downwards).

In some embodiments, as shown in FIG. 4I, second region 412-2 of optical assembly 412 does not completely surround first region 412-1 of optical assembly 412 such that second region 412-2 of optical assembly 412 is not located adjacent to the first edge 412-A of optical assembly 412 in order to avoid obstructing a user's eye brow and/or brow bone. Accordingly, switchable window 414 does not completely surround emission surface 410 and switchable window 414 is not located adjacent to the first edge 410-A of emission surface 410 in order to avoid obstructing a user's eye brow and/or brow bone.

Figure 4K:
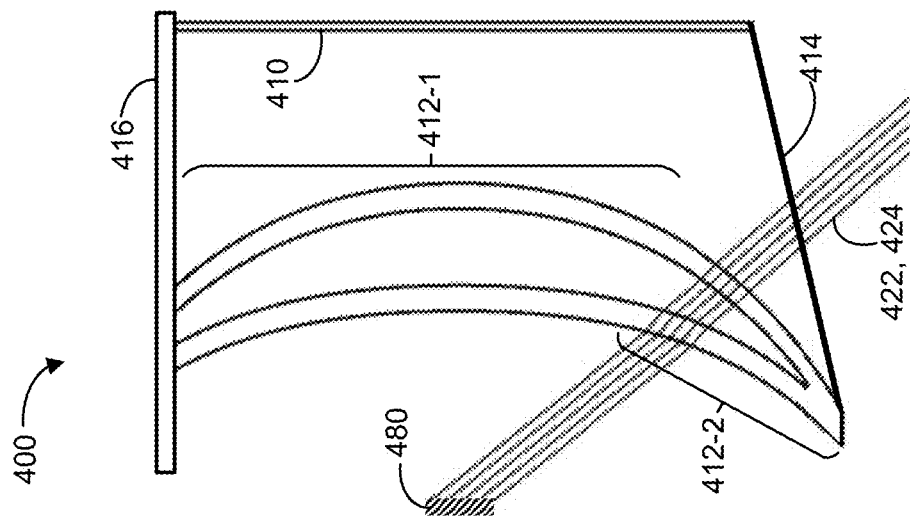
FIGS. 4J-4M illustrate optical paths of light in a display device in accordance with some embodiments.
Figure 4J:
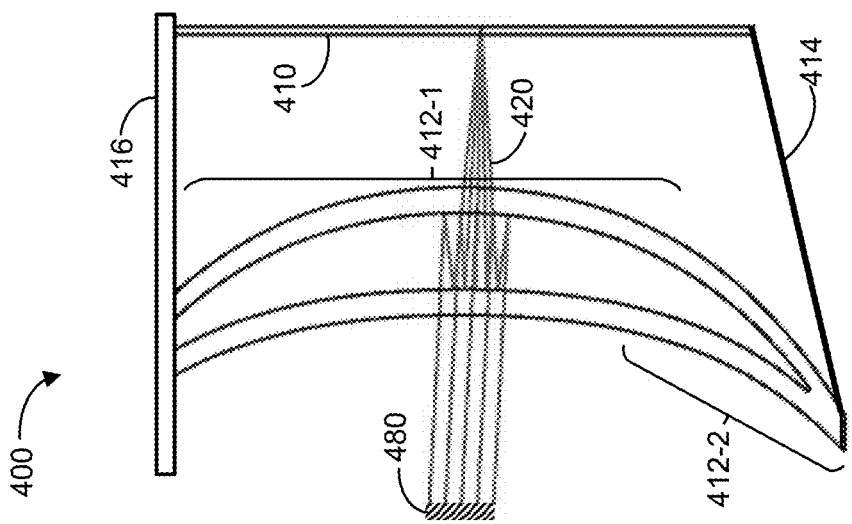
Figure 4M:
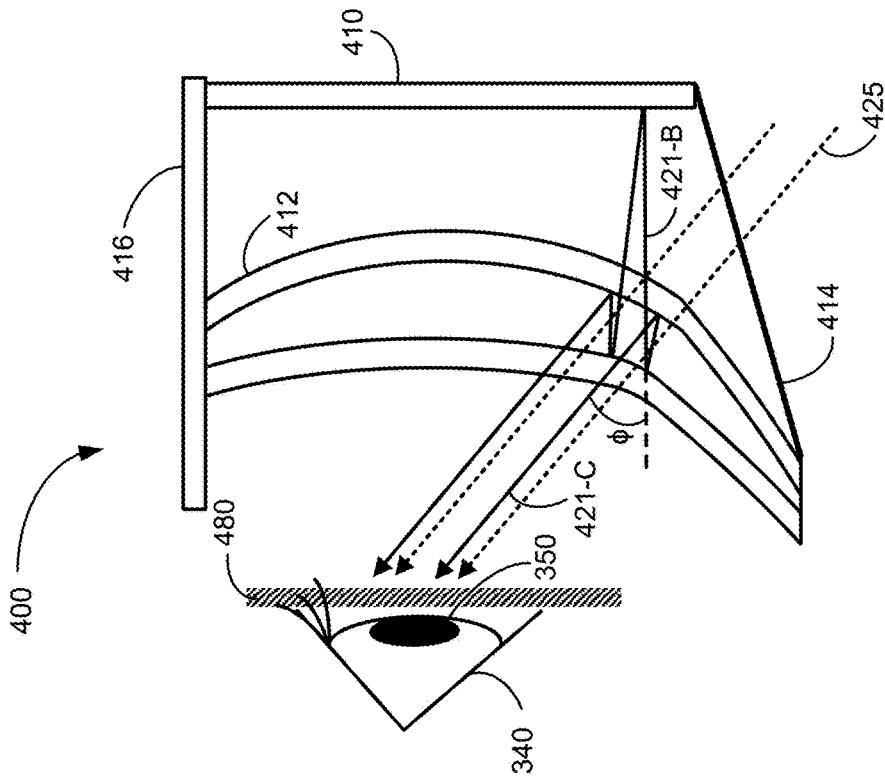
Figure 4L:
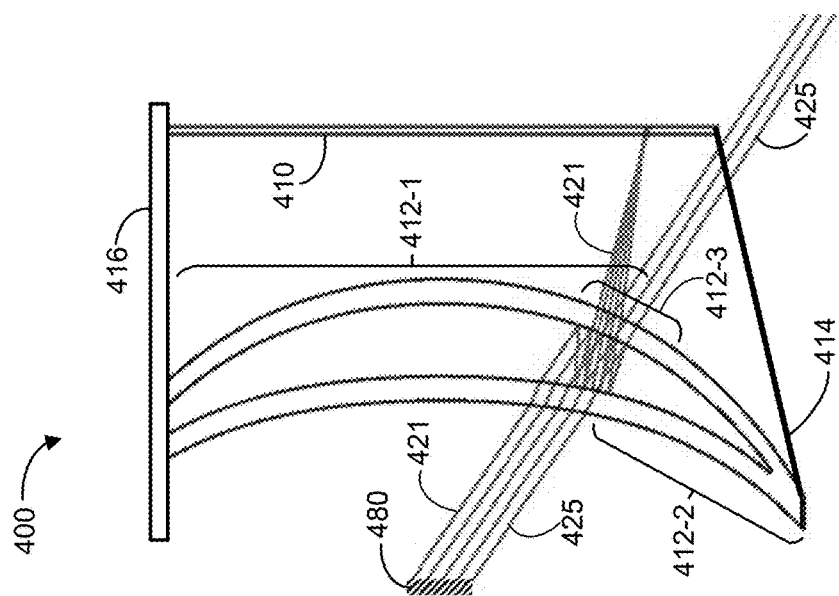

FIGS. 4J-4L illustrate optical paths of light in display device 400 in accordance with some embodiments.

FIG. 4J illustrates the optical paths of image light (e.g., ray 420) emitted from emission surface 410 and directed toward eyebox 480 through the first region 412-1 of optical assembly 412. As described above with respect to FIGS. 4A and 4B, the optical paths of ray 420 includes one or more folds that direct ray 420 toward eyebox 480.

FIG. 4K illustrates the optical paths of ambient light (e.g., rays 422, 424) transmitted through the second region 412-2 of optical assembly 412 and directed toward eyebox 480. As described above with respect to FIGS. 4A, 4C, and 4D, ambient light (e.g., rays 422 and 424) is not folded by the optical assembly 412. Thus, ambient light is transmitted through optical assembly 412 without significant optical aberrations.

FIG. 4L illustrates the optical paths of image light (e.g., ray 421) and optical paths of ambient light (e.g., ray 425) transmitted through the transition region 412-3 of optical assembly 412 and directed toward eyebox 480 at a same angle. Thus, ray 421 and ray 425 can be used to form mixed reality images, meaning that at least part of the transition region 412-3 can be used for mixed-reality applications. As described above with respect to FIGS. 4A and 4B, the optical paths of ray 421 includes one or more folds. As described above with respect to FIGS. 4A, 4C, and 4D, ray 425 is transmitted through the transition region 412-3 of optical assembly 412 without significant optical aberrations.

Referring to FIG. 4M, ray 421 starts as ray 421-B, which is emitted from emission surface 410 in a first direction, and ray 421 is directed, through transition region 412-3 of optical assembly 412, toward eyebox 480 as ray 421-C in a second direction that forms an angle (I) with the first direction. In contrast, ray 425 is transmitted through the transition region 412-3 of optical assembly 412 without a change in direction. Thus, for ray 425 to arrive at eyebox 480 in the second direction, it should enter the optical assembly also in the second direction. In some embodiments, the size of at least part of the transition region 412-3 that can be used for mixed-reality applications (e.g., region of display device 400 that allows ambient light and image light to be transmitted to the user's eyes at the same directions) depends on angle (I). In some embodiments, having a large angle (I) corresponds to a larger region in the optical assembly for mixed-reality applications. In some embodiments, to provide a large angle (I), one or more optical elements of optical assembly 412 are designed to create greater optical distortion (for example, barrel distortion, pincushion distortion, wavy distortion). For example, for a ray at 45 degrees of a user's field of view, optical assembly 412 will redirect the ray by at least 20 degrees. For example, one or more optical components of optical assembly 412 may be configured to provide optical distortion in order to provide a large angle (I) (e.g., angle (I) is between 20 degrees and 50 degrees). In some embodiments, the optical distortion may also correct and/or reduce optical aberrations of ambient light (e.g., rays 422, 424, and 425) that is directed toward eyebox 480. Thus, in some embodiments, it may be desirable for optical assembly 412 to include one or more optical components that provide large optical distortion in order to provide a large region in the user's field of view for mixed-reality applications and/or reduce optical aberrations of ambient light that is transmitted to eyebox 480.

Figure 4N:
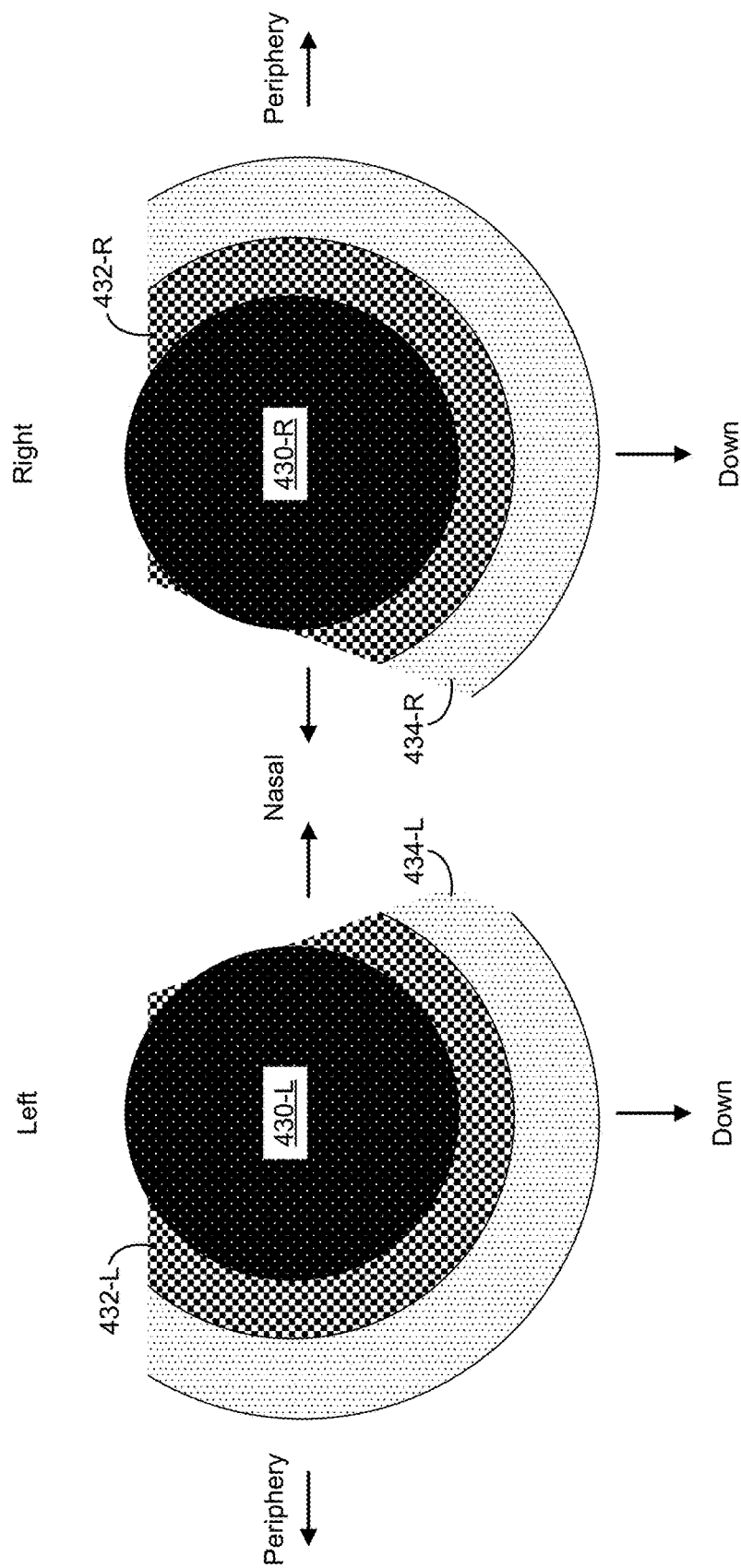
FIG. 4N illustrates a field of view of a display device in accordance with some embodiments.

FIG. 4N illustrates a field of view for a left eye and a right eye of a user of display device 400 in accordance with some embodiments, with arrows showing certain directions of a viewer's gaze (e.g., downwards, towards a periphery of display device, or towards the user's nose). For a user's left eye, region 430-L of the user's field of view corresponds to virtual reality applications. In region 430-L, the user sees image light (e.g., ray 420) that is transmitted from emission surface 410 of display device 400, through the first region 412-1 of optical assembly 412 toward the eyebox 480. Region 432-L of the user's left eye field of view corresponds to mixed-reality (e.g., augmented reality) applications. In region 432-L, the user sees image light (e.g., ray 421) emitted from emission surface 410, and ambient light (e.g., ray 425) transmitted through switchable window 414, that are transmitted through the transition region 412-3 of optical assembly 412 and directed to the eyebox 480. Region 434-L of the user's left eye field of view corresponds to see-through applications. In region 434-L, the user sees ambient light (e.g., rays 422, 424) that are transmitted through the second region 412-2 of optical assembly 412 and directed to the eyebox 480. Regions 430-R, 432-R, and 434-R of the use's right eye field of view corresponds to regions 430-L, 432-L, and 434-L of the user's left eye field of view, respectively. In certain embodiments, one or more optical elements of optical assembly 412 are designed to create greater optical distortion in order to enlarge regions 432-L and 432-R, so as to allow a larger portion of the user's field of view to be used for mixed reality applications.

In accordance with some embodiments, a display device (e.g., display device 400) is operable in either one of a first mode (e.g., normal mode) and a second mode (e.g., see-through mode). The display device includes an emission surface (e.g., emission surface 410) configured to output image light (e.g. ray 420), a switchable window (e.g., switchable window 414) configurable to block ambient light (e.g., rays 422 and 424) from outside the display device in the first mode and to transmit ambient light in the second mode, and an optical assembly (e.g., optical assembly 412) having a first region (e.g., first region 412-1 of optical assembly 412) configured to receive image light from the emission surface and to direct the image light with a first optical power, and a second region (e.g., second region 412-2 of optical assembly 412) configured to receive the ambient light from the switchable window in the second mode and to allow at least a portion of the received ambient light to pass through with a second optical power distinct from and less than the first optical power. In some embodiments, the emission surface includes a quarter wave plate. In some embodiments, the quarter wave plate is configured to convert light from a linear polarization to a circular polarization and vice versa. In some embodiments, the emission surface is configured to selectively transmit at least a portion of ambient light. In some embodiments, the emission surface is transparent to visible light. In some embodiments, the emission surface is configured to block at least a portion of ambient light. In some embodiments, the emission surface is transparent to near-infrared light. In some embodiments, the emission surface is transparent to infrared light.

In some embodiments, the second region of the optical assembly (e.g., second region 412-2 of optical assembly 412) is configured to transmit light to an eye of a user with reduced optical aberration compared to the first region of the optical assembly (e.g., first region 412-1 of optical assembly 412). In some embodiments, the second region of the optical assembly is configured to transmit light to an eye of a user without significant optical aberration. In some embodiments, the second region of the optical assembly is configured to transmit light to an eye of a user with no optical aberration.

In some embodiments, the second optical power is zero.

In some embodiments, the second region of the optical assembly is configured to transmit light without a change in direction (e.g., rays 422 and 424 do not change direction after transmitting through second region 412-1 of optical assembly 412).

In some embodiments, the emission surface (e.g., emission surface 410) has a first edge (e.g., first edge 410-A) and a second edge (e.g., second edge 410-B) opposite to the first edge. In some embodiments, the switchable window (e.g., switchable window 414) has a first edge (e.g., first edge 414-A) and a second edge (e.g., second edge 414-B) opposite to the first edge. In some embodiments, the optical assembly (e.g., optical assembly 412) has a first edge (e.g., first edge 412-A) and a second edge (e.g., second edge 412-B) opposite to the first edge. The first region of the optical assembly is adjacent (e.g., touching or connected) to the first edge of the optical assembly (e.g., first region 412-1 of optical assembly 412 is adjacent to first edge 412-A of optical assembly 412). The second region of the optical assembly is adjacent to the second edge of the optical assembly (e.g., second region 412-2 of optical assembly 412 is adjacent to second edge 412-B of optical assembly 412). The first edge (e.g., first edge 414-A) of the switchable window is disposed adjacent to the second edge (e.g., second edge 410-B) of the emission surface. The second edge (e.g., 414-B) of the switchable window is disposed adjacent to the second edge of the optical assembly (e.g., 412-B). The first edge (e.g., first edge 412-A) of the optical assembly is disposed proximate to the first edge (e.g., first edge 410-A) of the emission surface. In some embodiments, the display device also includes a frame (e.g., display device 400 includes frame 416). In some embodiments, the second edge (e.g., second edge 414-B) of the switchable window extends towards a cheek of the user. In some embodiments, the second edge of optical assembly (e.g., second edge 412-B) extends towards a cheek of the user.

In some embodiments, the first region (e.g., first region 412-1 of optical assembly 412) and the second region (e.g., second region 412-2 of optical assembly 412) are regions of a same piece of optical material (e.g., a substrate, a semiconductor substrate, or glass).

Figure 5A:
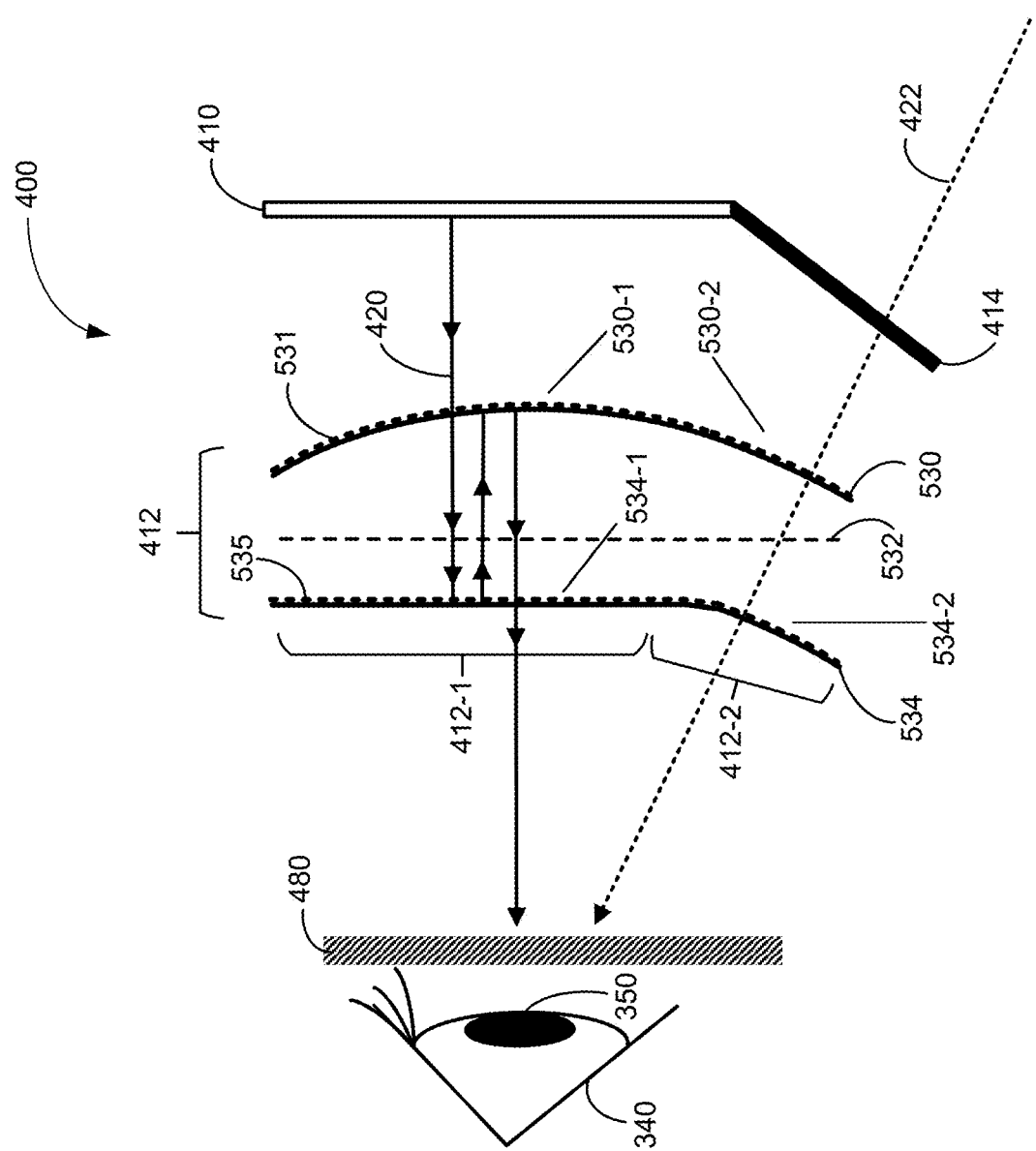
FIGS. 5A and 5B illustrate optical paths of light in a display device in accordance with some embodiments.
Figure 5B:
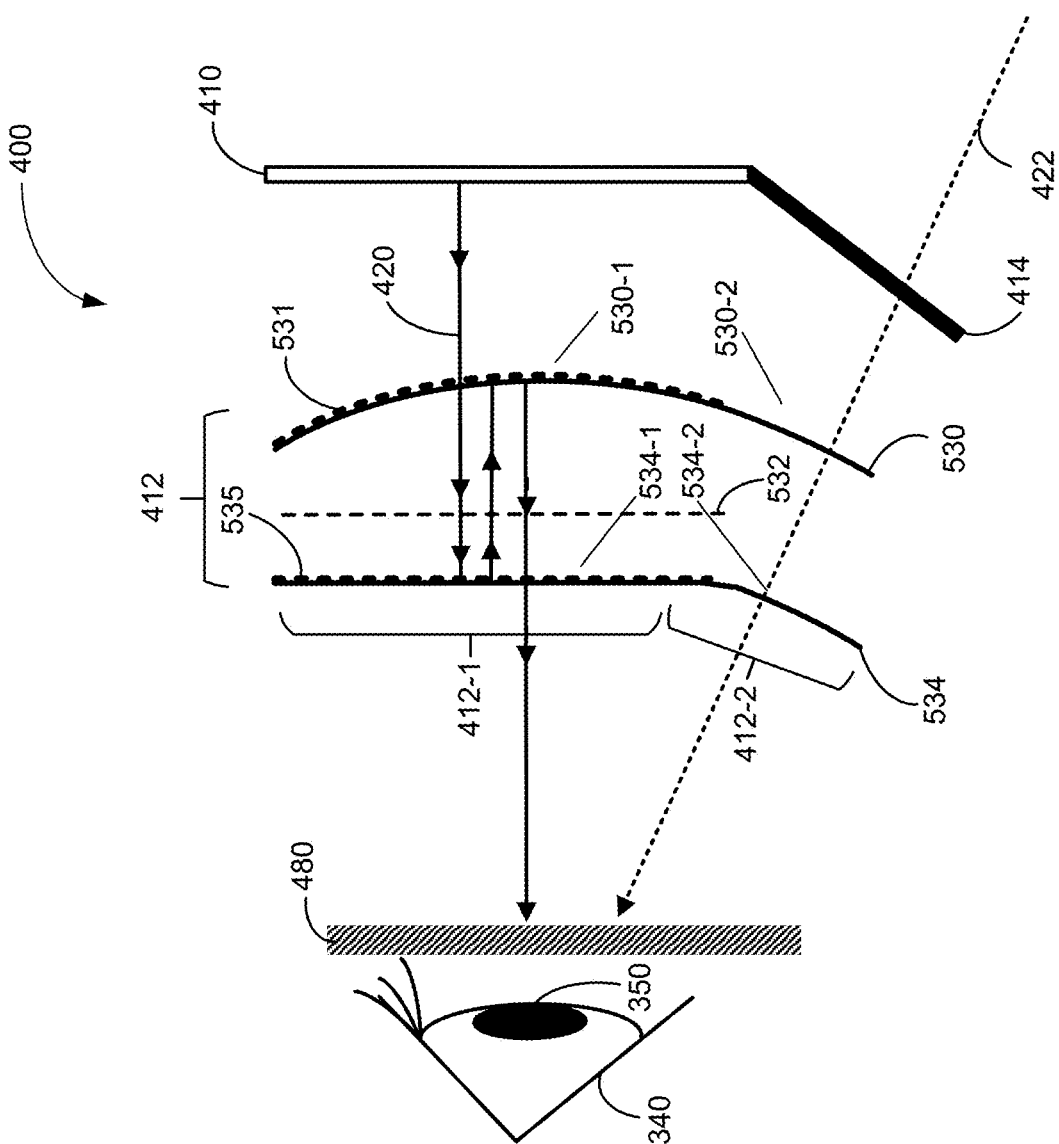

FIGS. 5A and 5B illustrate optical paths of light in a display device in accordance with some embodiments. As shown in FIG. 5A, optical assembly 412 (e.g., a pancake lens assembly) includes a beam splitter 530 (e.g., a 50/50 mirror), an optical retarder 532 (e.g., a quarter wave plate), and a reflector 534. In some embodiments, reflector 534 is a polarizing reflector that is configured to reflect light having a first linear polarization and transmit light having a second linear polarization. As discussed above, optical assembly 412 has a first region 412-1 and a second region 412-2. Accordingly, each optical component (e.g., beam splitter 530, optical retarder 532, and reflector 534) of optical assembly 412 also has a first section corresponding to the first region 412-1 of optical assembly 412 and a second section corresponding to the second region 412-2 of optical assembly 412. As discussed above, the first region 412-1 of optical assembly 412 is configured to direct image light (e.g., ray 420) output by emission surface 410 to the pupil 350 of a user's eyes 340 such that the ray 420 has an optical path that includes one or more folds. The second region 412-2 of optical assembly 412 is configured to transmit external light (e.g., rays 422 and 424) transmitted through switchable window 414, when device 400 is in see-through mode, to the pupil 350 of a user's eyes 340 without forming any fold in its optical path such that the rays 422 and 424 have little or reduced optical aberrations (e.g., optical assembly 412 does not add optical aberrations to ray 422 and 424).

In some embodiments, beam splitter 530 may have a 50% transmission/50% reflection coating 531, and/or reflector 534 may have a polarizing reflective coating 535. Optical retarder 532 may also be a thin film formed on the reflector 535 or the beam splitter 530. In some embodiments, as shown in FIG. 5A, one or more coatings or thin films extends across both the first region 412-1 and the second region 412-2 of optical assembly, so that both the image light (e.g., ray 420) and ambient light (e.g., ray 422) would travel through the one or more coatings or thin films. In some embodiments, as shown in FIG. 5B, one or more coatings or thin films in the first region 412-1 may gradually transition to one or more different coatings or thin films or taper off to no coating or thin film in the second region 412-2 (e.g., first section 530-1 of beam splitter 530 may have a 50% transmission/50% reflection coating 531 and the beam splitter coating 531 may gradually taper off to an 80% transmission/20% reflection coating or antireflective coating or no coating in at least part of the second section 530-2 of beam splitter 530). Also, in some embodiments, as shown in FIGS. 5A and 5B, an optical component (e.g., beam splitter 530) of optical assembly 412 may have a first curvature in the first region 412-1, which contributes to the optical power of the first region 412-1, and the curvature of the optical component may gradually change to have a second curvature different from the first curvature or no curvature in at least part of the second region 412-2 (e.g., first section 530-1 of beam splitter 530 may have a first curvature corresponding to the first optical power the curvature of the beam splitter 530 may gradually and continuously transition to a second curvature corresponding to the second optical power or being flat in at least part of the second section 530-2 of beam splitter 530). In some embodiments, as shown in FIG. 5B, reflector 534 includes a polarizing reflector film or coating 535 in the first region 412-2 of optical assembly 412 that does not extend to at least part of the second region 412-2. Thus, ambient light (e.g., ray 422) entering through switchable window 414 does not experience the effect of the polarizing reflector film or coating 535. In some embodiments, each optical component in optical assembly 412 is formed on a same optical element or substrate that extends across both the first region 412-1 and the second region 412-2 of the optical assembly (e.g., first section 530-1 of beam splitter 530 and second section 530-2 of beam splitter 530 may be formed with a single piece of optical material or on the same substrate).

In some embodiments, optical assembly 412 abruptly transitions from the first region 412-1 to the second region 412-2. For example, one or more coatings in the first region 412-1 may end abruptly near the intersection of the first region 412-1 or the second region 412-2, or somewhere in the transition region (e.g., first section 530-1 of beam splitter 530 may have a 50% transmission/50% reflection coating and second section 530-2 of beam splitter 530 may allow ~100% transmission of light either by not having a coating or having a different coating than first section 530-1). Another example, an optical component in optical assembly 412 may have a first curvature in the first region 412-1 the curvature of the optical component may abruptly change to a second curvature different from the first curvature in the second region 412-2 (e.g., first section 530-1 of beam splitter 530 may have a first curvature corresponding to the first optical power and second section 530-2 of beam splitter 530 may have a second curvature corresponding to the second optical power such that the transition from the first curvature to the second curvature may be discontinuous). In some embodiments, an optical component in optical assembly 412 may have a first flat surface in the first region 412-1 and a second flat surface in the second region 412-2, but the second flat surface is angled with respect to the first flat surface. For example, reflector 534 has first flat surface 534-1 in the first region 412-1 and second flat surface 534-2 in the second region 412-2. The second flat surface 534-2 forms an angle with the first flat surface 534-1 so as to be substantially parallel to the second section 530-2 of beam splitter 530. Thus, ambient light going through the second section 530-2 of beam splitter 530 and the second flat surface 534-1 of the reflector 534 would reach the eye 340 of the user with little or no optical aberration. In some embodiments, an optical component in optical assembly 412 may only be present in the first region 412-1 or the second region 412-2. For example, as shown in FIG. 5, optical retarder 532 may be a coating on reflector 534 and may not extend to at least some part of the second region. In some embodiments, an optical component of optical assembly 412 may include two distinct optical elements in the two regions 412-1 and 412-2 that have been joined (e.g., first section 530-1 of beam splitter 530 may be a first optical element and second section 530-2 of beam splitter 530 may be a second optical element distinct from the first optical element and the two optical elements are joined or combined to create beam splitter 530 having a first section 530-1 and a second section 530-2).

Figure 6A:
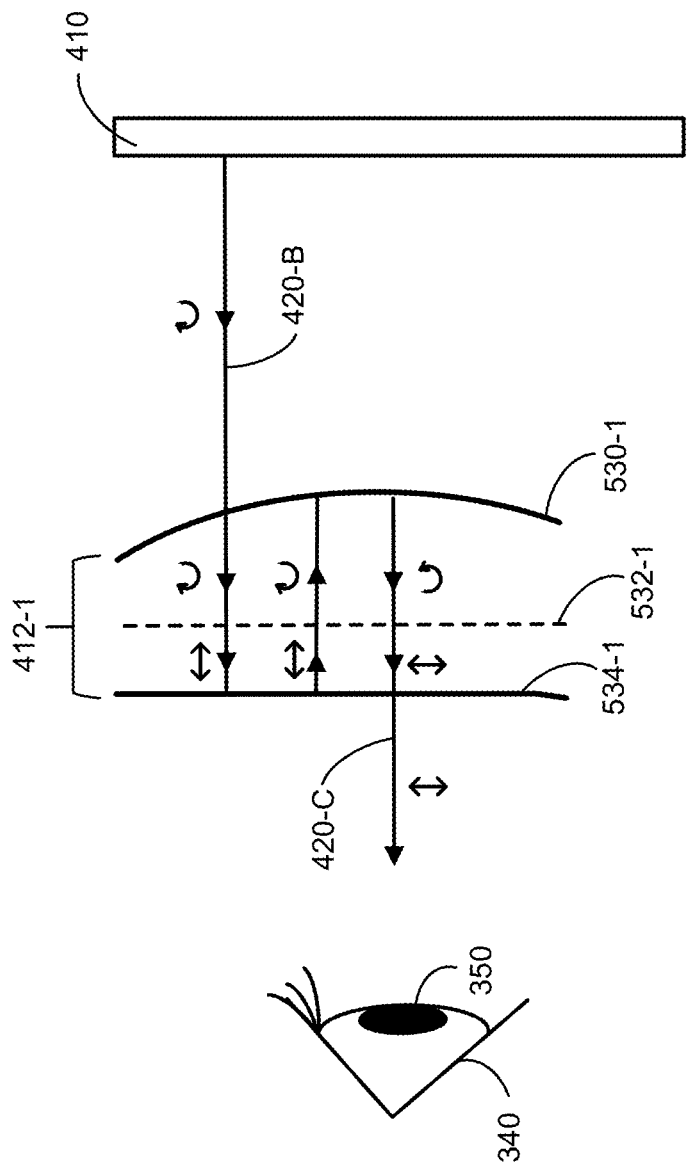
Figure 6B:
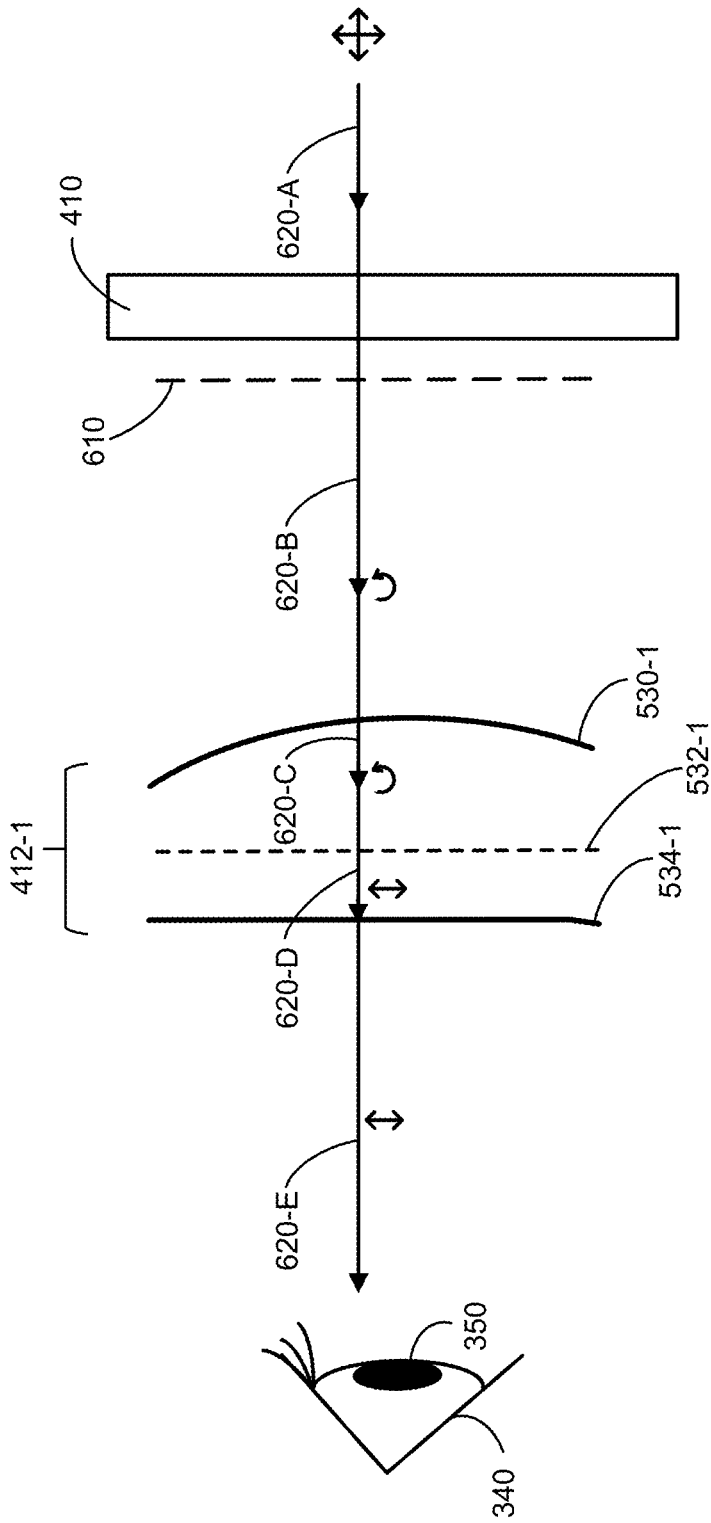

FIGS. 6A-6B illustrate polarization along the optical path of light (e.g., ray 420) in optical assembly 412 in accordance with some embodiments. FIGS. 6A and 6B show the optical path of image light (e.g., ray 420) output by emission source 410 as it propagates through the first region 412-1 of optical assembly 412. The first section 530-1 of beam splitter 530, corresponding to the first region 412-1 of optical assembly 412; the first section 532-1 of optical retarder 532, corresponding to the first region 412-1 of optical assembly 412; and the first section 534-1 of reflector 534 corresponding to the first region 412-1 of optical assembly 412, are shown.

Referring to FIG. 6A, the first section 530-1 of beam splitter 530 in the first region is configured to receive ray 420-B having a first polarization and to output first light by transmitting at least a portion of ray 420-B toward first section of optical retarder 532-1. The first section 532-1 of optical retarder 532 is configured to convert the first light, having the first polarization to a second polarization different from the first polarization. The first section 534-1 of reflector 543 is configured to receive the second light, having the second polarization and to output third light by reflecting the second light. The first section 532-1 of optical retarder 532 is further configured to convert the third light, having the second polarization to the first polarization. The first section 530-1 of beam splitter 530 is further configured to receive the third light having the first polarization and to output a fourth light, having a third polarization, by reflecting at least a portion of the third light. The first section 532-1 of optical retarder 532 is configured to convert the fourth light from a third polarization to a fourth polarization. The first section 534-1 of reflector 543 is further configured to output ray 420-C by transmitting at least a portion of the fourth light having the fourth polarization such that ray 420-C is directed to the pupil 350 of a user's eyes 340. The optical path of the image light (represented in part by rays 420-B and 420-C) includes one or more folds in the optical path in order to increase the optical path length of the image light. In some embodiments, the first polarization and the third polarization are circular polarizations and opposite to one another. In some embodiments, the second polarization and the fourth polarization are linear polarizations and are orthogonal to one another.

Referring to FIG. 6B, in some embodiments, at least part of emission surface 410 is partially transparent and allows ambient light to pass through and be transmitted to an eye of a user through the first region 412-1 of optical assembly. In such embodiments, the ambient light (e.g., ray 620-A) passing through the at least part of the emission surface 410 is subsequently polarized (e.g., by an optional polarizer 610) before reaching the beam splitter 530. As shown in FIG. 6B, the first section 530-1 of beam splitter 530 is configured to receive polarized ambient ray 620-B having the third polarization and to transmit at least a portion of ray 620-B as ray 620-C. The first section 532-1 of optical retarder 532 is configured to convert ray 620-C having the third polarization to ray 620-D having the fourth polarization. The first section 534-1 of reflector 543 is configured to transmit at least a portion of ray 620-D as ray 620-E also having the fourth polarization. The optical path of the image light represented in part by rays 620-B through 620-E does not include any folds in the optical path.

Figure 6D:
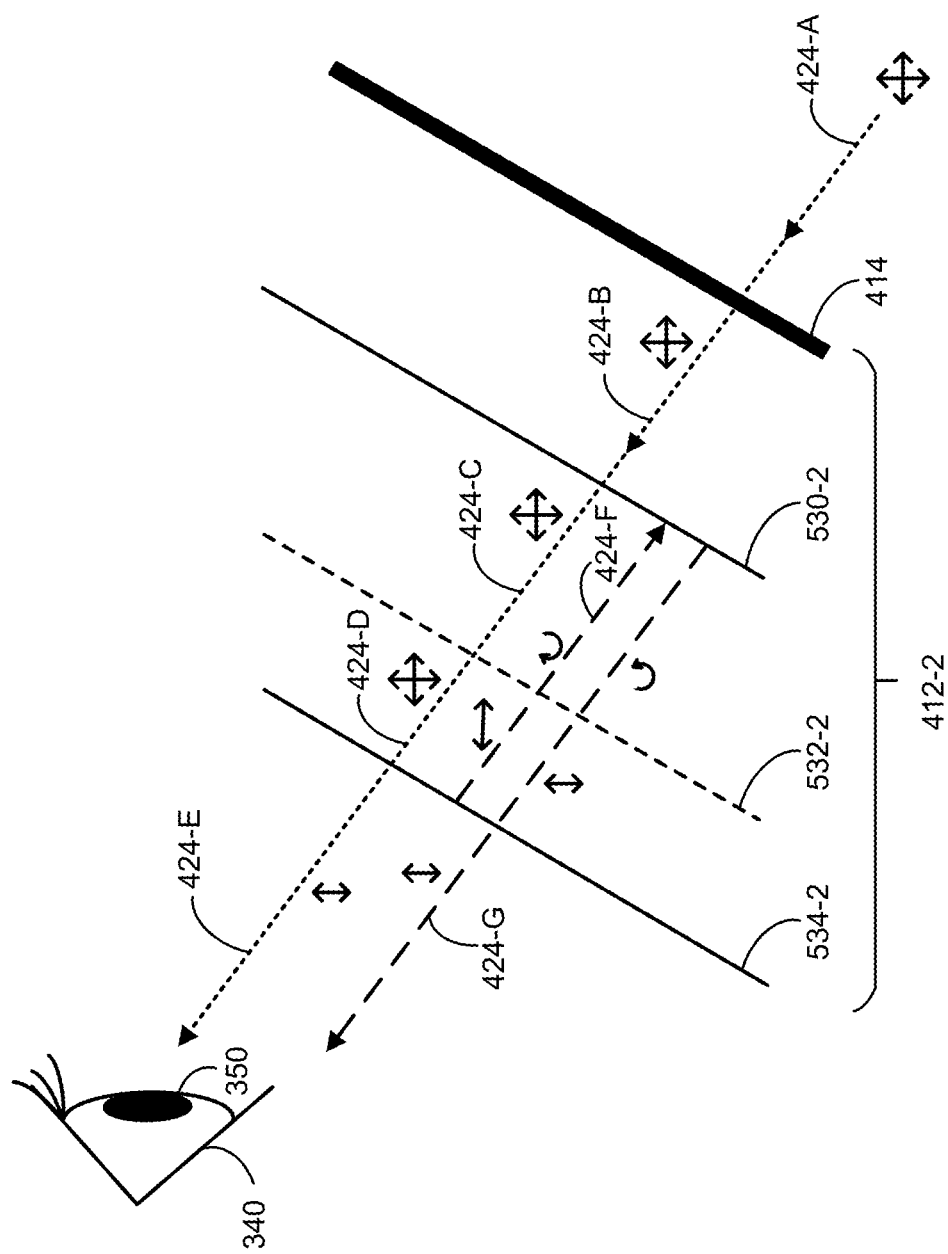

FIGS. 6C-6D show polarization in the optical path of external (or ambient) light transmitted through switchable window 414 when display device 400 is in the see-through mode. FIG. 6C illustrates polarization along the optical path of light (e.g., ray 422) in optical assembly 412 in accordance with some embodiments. FIG. 6C illustrates polarization along the optical path of light (e.g., ray 424) in optical assembly 412 in accordance with some embodiments.

The second section 530-2 of beam splitter 530, corresponding to the second region 412-2 of optical assembly 412; the second section 532-2 of optical retarder 532, corresponding to the second region 412-2 of optical assembly 412; and the second section 534-2 of reflector 534 corresponding to the second region 412-2 of optical assembly 412, are shown.

In some embodiments, as shown in FIG. 6C, switchable window 414 in the see-through mode is also a polarizer and transmits at least a portion of the unpolarized external ambient light (e.g., ray 422-A) as ray 422-B having the third polarization. In some embodiments, as shown in FIG. 6D, switchable window 414 in the see-through mode transmits at least a portion of the unpolarized external ambient light (e.g., ray 424-A) as ray 424-B that is unpolarized after passing through the switchable window. Details regarding the switchable window are disclosed below with respect to FIGS. 7A-7J.

Referring to FIG. 6C, when display device 400 is in the see-through mode, switchable window 414 transmits at least a portion of external light (e.g., ray 422-A) into the housing or interior space of display 400 as ray 422-B having the third polarization. The second section 530-2 of beam splitter 530 is configured to receive ray 422-B having the third polarization and to transmit at least a portion of ray 422-B as 422-C. The second section 532-2 of optical retarder 532 is configured to convert ray 422-C into ray 422-D having the fourth polarization. The second section 534-2 of reflector 543 is configured to transmit at least a portion of ray 422-D as ray 422-E having the fourth polarization. Thus, unlike the optical path of the image light (e.g., ray 420) through the first region 412-1 of optical assembly 412, the optical path of the external light (e.g., ray 422) represented by rays 422-A through 422-E does not have any folds in its optical path. As a result, external light (e.g., ray 422) is transmitted to the pupil 350 of the user's eyes 340 with minimal or reduced optical aberrations (e.g., optical power, focus, astigmatism, and/or distortion). In some embodiments, external light (e.g., ray 422) is transmitted to the pupil 350 of the user's eyes 340 such that the second region 412-2 of optical assembly 412 does not add optical aberrations to the external light. In some embodiments, the second region 412-2 of optical assembly 412 exerts zero optical power on ray 422.

Referring to FIG. 6D, when display device 400 is in the see-through mode, switchable window 414 transmits at least a portion of unpolarized external light (e.g., ray 424-A) into the housing or interior space as unpolarized ray 424-B. The second section 530-2 of beam splitter 530 is configured to receive unpolarized ray 424-B and to transmit at least a portion of ray 424-B as unpolarized ray 424-C, which is then transmitted through the second section 532-2 of optical retarder 532 (if the optical retarder 532 has the second section 532-2) as unpolarized ray 424-D. The second section 534-2 of reflector 543 (if it is included in optical assembly 412) is configured to transmit at least a portion of unpolarized ray 424-D as ray 424-E that has the fourth polarization. In some embodiments, the second section 534-2 of reflector 543 may reflect a portion of ray 424-D and the reflected ray would reach the beam splitter as ray 424-F. In such cases, a portion of ray 424-F may be reflected back towards the eye 340, at second section 530-2 of beam splitter 530, and eventually become ray 424-G after passing through reflector 534-2, which may travel towards the eye 340 and enter the pupil 350 as stray light. In order to reduce or mitigate stray light entering the eye, the reflective coating 531 of beam splitter 530 may be tapered towards second edge 412-B of optical assembly 412. Examples of a tapered reflective coating are discussed in further detail below. The optical path of the external light represented by rays 424-A through 424-E does not include any folds in its optical path. In some embodiments, external light (e.g., ray 424) is transmitted to the pupil 350 of the user's eyes 340 such that optical aberrations (e.g., optical power, focus, astigmatism, and/or distortion) are reduced, minimized, or eliminated. In some embodiments, external light (e.g., ray 424) is transmitted to the pupil 350 of the user's eyes 340 such that the second region 412-2 of optical assembly 412 does not add optical aberrations to the external light. In some embodiments, the second region 412-2 of optical assembly 412 exert zero optical power on the ambient light (e.g., ray 424).

In some embodiments, the optical components of second region 412-2 of optical assembly 412 have no curvature. In some embodiments, the optical components of second region 412-2 of optical assembly 412 have curvatures that sum to a total optical power of zero. In some embodiments, the second section 530-2 of beam splitter 530 is configured to reflect at least 50% of incident light. For example, the second section 530-2 of beam splitter 530 may have one or more of a 50% transmission/50% reflection, 60% transmission/40% reflection, 70% transmission/30% reflection, 80% transmission/20% reflection, or 90% transmission/10% reflection coating. In some embodiments, the second section 530-2 of beam splitter 530 may allow ~100% transmission. For example, the second section 530-2 of beam splitter 530 may be uncoated or may have coating that allows ~100% transmission. In some embodiments, beam splitter 530 may have a 50% transmission/50% reflection coating in the first section 530-1 that gradually tapers to a different ratio in the second section 530-2.

In some embodiments, the optical assembly (e.g., optical assembly 412) includes one or more optical components (e.g., beam splitter 530, optical retarder 532, and reflector 534). Each optical component has a first section in the first region and a second section in the second region (e.g., beam splitter 530 has a first section 530-1 and a second section 530-2 that corresponds to the first region 412-1 and the second region 412-2 of optical assembly 412, respectively).

In some embodiments, each optical component of the one or more optical components (e.g., beam splitter 530, optical retarder 532, and reflector 534) has a respective surface that is smooth and continuous.

In some embodiments, the one or more optical components includes a beam splitter that has a first section and second section (e.g., optical assembly 412 includes beam splitter 530 that has a first section 530-1 and a second section 530-2). The first section of the beam splitter has a first curvature contributing to the first optical power and the second section of the beam splitter has a second curvature distinct from the first curvature (e.g., first section 530-1 of beam splitter 530 has a first curvature that contributes to the first optical power and second section 530-2 of beam splitter 530 has a second curvature that is different from the first curvature).

In some embodiments, the one or more optical components includes a reflector that has a first section and second section (e.g., optical assembly 412 includes reflector 534 that has a first section 534-1 and a second section 532-4). The first section of the reflector has a first curvature contributing to the first optical power and the second section of the reflector has a second curvature distinct from the first curvature (e.g., first section 534-1 of reflector 534 has a first curvature that contributes to the first optical power and second section 534-2 of reflector 534 has a second curvature that is different from the first curvature).

In some embodiments, the one or more optical components include a beam splitter (e.g., beam splitter 530), a reflector (e.g., optical retarder 532), and a first optical retarder (e.g., optical retarder 532). The first optical retarder is located between the beam splitter and the reflector.

The first section of the beam splitter is configured to output first image light by transmitting at least a portion of the image light (e.g., first section 530-1 of beam splitter 530 transmits at least a portion of ray 420-B). The first section of the first optical retarder is configured to convert the first image light from a first polarization to a second polarization (e.g., first section 532-1 of optical retarder 532 converts the transmitted portion of ray 420-B from a first polarization to a second polarization). The first section of the reflector is configured to output a second image light by reflecting the first image light having the second polarization towards the first optical retarder and beam splitter (e.g., first section 534-1 of reflector 534 reflects the transmitted portion of ray 420-B having a second polarization toward optical retarder 532 and beam splitter 530). The first section of the first optical retarder is further configured to convert the second image light from the second polarization to the first polarization (e.g., first section 532-1 of optical retarder 532 converts the reflected portion of ray 420-B having the second polarization to the first polarization). The first section of the beam splitter is configured to receive the second image light in the first polarization, and to output a third image light by reflecting at least a portion of the second image light, the third image light having a third polarization that is opposite to the first polarization (e.g., first section 530-1 of beam splitter 530 reflects at least a portion of ray 420-B, transmitted through optical retarder 532, having the first polarization such that the portion of ray 420-B that is reflected at the first section 530-1 of beam splitter 530 has a third polarization). The first section of the first optical retarder is further configured to convert the third image light from the third polarization to a fourth polarization that is orthogonal to the second polarization (e.g., first section 532-1 of optical retarder 532 converts the reflected portion of ray 420-B having the third polarization to the fourth polarization). The first section of the reflector is configured to transmit at least a portion of the third image light in the fourth polarization (e.g., first section 534-1 of reflector 534 transmits at least a portion of ray 420-B, transmitted through optical retarder 532, having the fourth polarization). In some embodiments, the optical retarder is a quarter wave plate. The quarter wave plate is configured to convert light between linear and circular polarizations. In some embodiments, the reflector is a polarizing reflector that reflects light having a first linear polarization and transmits light having a second linear polarization (e.g., reflects light having the second polarization and transmits light having the fourth polarization).

In some embodiments, the second section of the beam splitter is configured to transmit at least a first portion of the received ambient light (e.g., the second section 530-2 of beam splitter 530 transmits at least a portion of ray 422-B). The second section of the optical retarder is configured to convert the first portion of the received ambient light from a third polarization to a fourth polarization (e.g., the second section 532-2 of optical retarder 532 converts the transmitted portion of ray 422-B from a third polarization to a fourth polarization). The second section of the reflector is configured to transmit a second portion of the received ambient light having the fourth polarization (e.g., the second section 534-2 of reflector 534 transmits at least a portion of transmitted ray 422-B having the fourth polarization).

In some embodiments, the second region of the optical assembly is configured to transmit at least a portion of the ambient light to an eye of a user and the optical path of the at least the portion of the ambient light does not include a fold (e.g., second region 412-2 of optical assembly 412 is configured to transmit at least a portion of rays 422-B and 424-B to the eye 340 of a user and the optical path of rays 422 and 424 does not include a fold).

In some embodiments, the optical assembly is configured to direct at least a portion of the image light from the emission surface to an eye of a user and the optical path of the at least the portion of the image light includes one or more folds (e.g., optical assembly 412 is configured to transmit at least a portion of ray 420-B, output from emission surface 410, to the eye 340 of a user and the optical path of ray 420 includes one or more folds). In some embodiments, the optical path of the at least a portion of the image light includes two folds. In some embodiments, the second region of optical assembly is configured to direct at least a portion of the image light from the emission surface to an eye of a user and the optical path of the at least the portion of the image light includes one or more folds (e.g., second region 412-2 of optical assembly 412 is configured to transmit at least a portion of ray 420-B, output from emission surface 410, to the eye 340 of a user and the optical path of ray 420 includes one or more folds).

In some embodiments, the display device (e.g., display device 400) is a head-mounted display device.

In light of these principles, we now turn to certain embodiments of switchable window 414.

FIGS. 7A-7J illustrate the optical path of light in a switchable window in accordance with some embodiments.

Figure 7A:
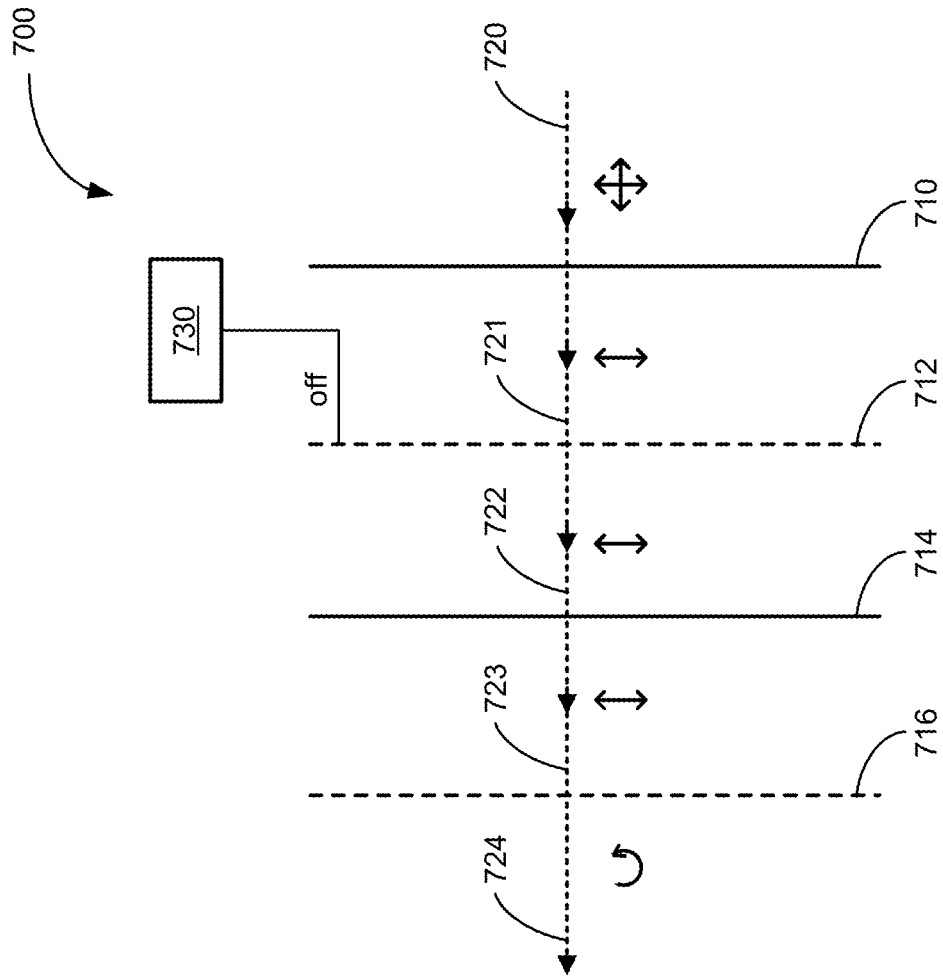
Figure 7B:
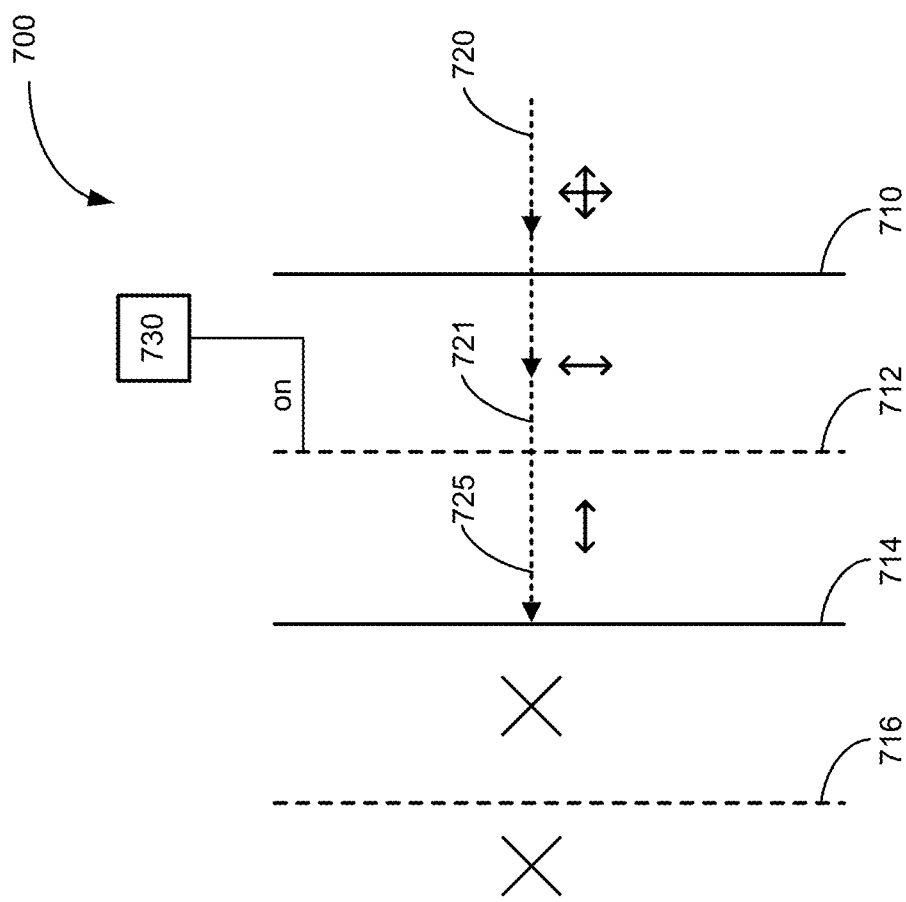

FIGS. 7A and 7B illustrate switchable window according to some embodiments. As shown in FIGS. 7A and 7B, switchable window 700 (corresponding to switchable window 414) includes a first polarizer 710, a switchable optical retarder 712, a polarizer 714, an optical retarder 716, and controller 730 coupled to switchable optical retarder 712. Controller 730 is configured to be able to turn switchable optical retarder 712 to "on" or "off" depending on whether display 400 is in the normal mode or see-through mode, respectively. Switchable optical retarder 712 is configured to convert light from an initial polarization to an opposite or orthogonal polarization when it is "on" (e.g., switchable optical retarder 712 is a half wave-plate when it is "on"). Switchable optical retarder 712 is configured to transmit light without changing polarization of the light when it is "off" (e.g., switchable optical retarder 712 acts like a transparent substrate when it is "off").

Referring to FIG. 7A, first polarizer 710 is configured to receive external light (e.g., ray 720). Often times, as shown, external light is unpolarized. First polarizer 710 is configured to transmit at least a portion of unpolarized external light (e.g., ray 720) as ray 721 having the fourth polarization. When switchable optical retarder 712 is "off", ray 721 having the fourth polarization is transmitted through switchable optical retarder 712 as ray 722. Polarizer 714 is configured to transmit at least a portion of ray 722 light as ray 723 having the fourth polarization. Optical retarder 716 is configured to convert ray 723 having the fourth polarization to ray 724 having the third polarization. Thus, at least a portion of the external, is transmitted from the outside environment, through switchable window 700, and into the housing or interior space of display device 400, as ray 724 having the third polarization.

In some embodiments, first polarizer 710 and polarizer 714 are linear polarizers. As shown in FIGS. 7A and 7B, first polarizer 710 and polarizer 714 are configured to transmit light having the fourth polarization. In some embodiments, optical retarder 716 is a quarter wave plate.

Referring to FIG. 7B, first polarizer 710 is configured to receive external light (e.g., ray 720). First polarizer 710 is configured to transmit at least a portion of unpolarized external light having the fourth polarization as ray 721. When switchable optical retarder 712 is "on", ray 725 is converted from the fourth polarization to the second polarization. Polarizer 714 is configured to block (e.g., absorb or reflect) ray 725 having the second polarization. Thus, light (e.g., ray 725) is not transmitted through polarizer 714 and switchable window 700 has blocked external light (e.g., ray 725) from being transmitted from the outside environment into the housing or interior space of display device 400.

Figure 7C:
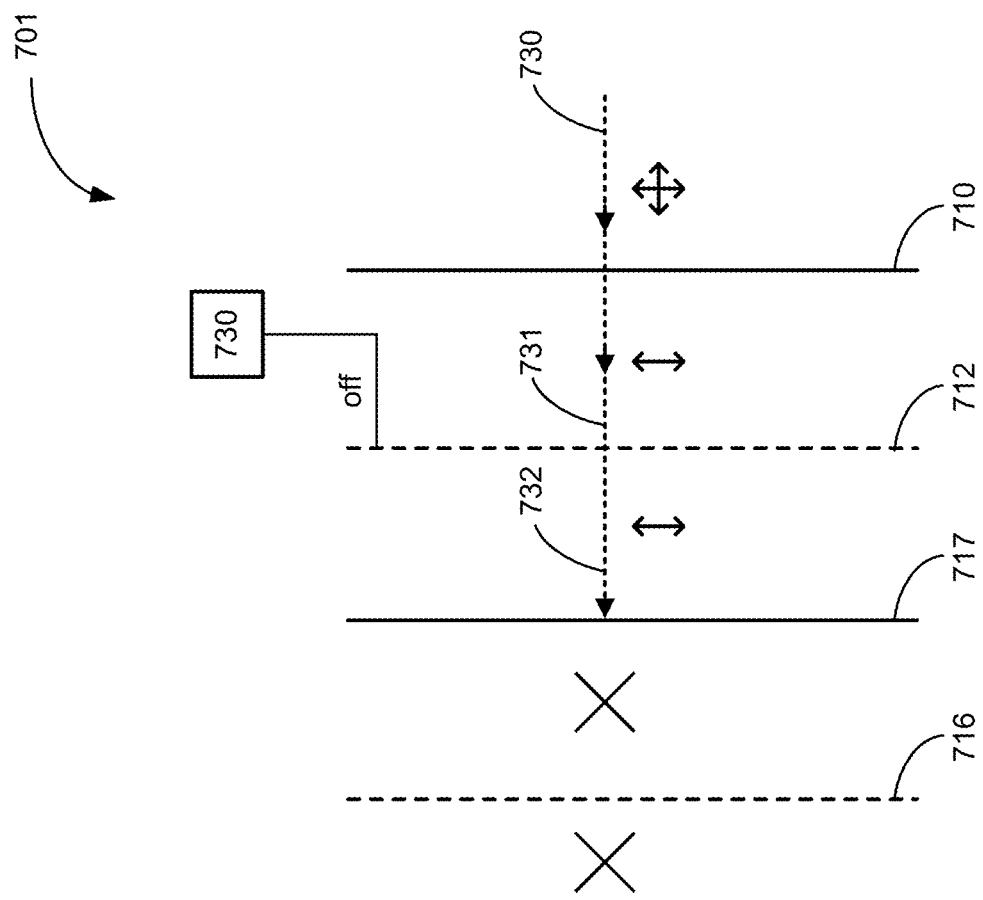
Figure 7D:
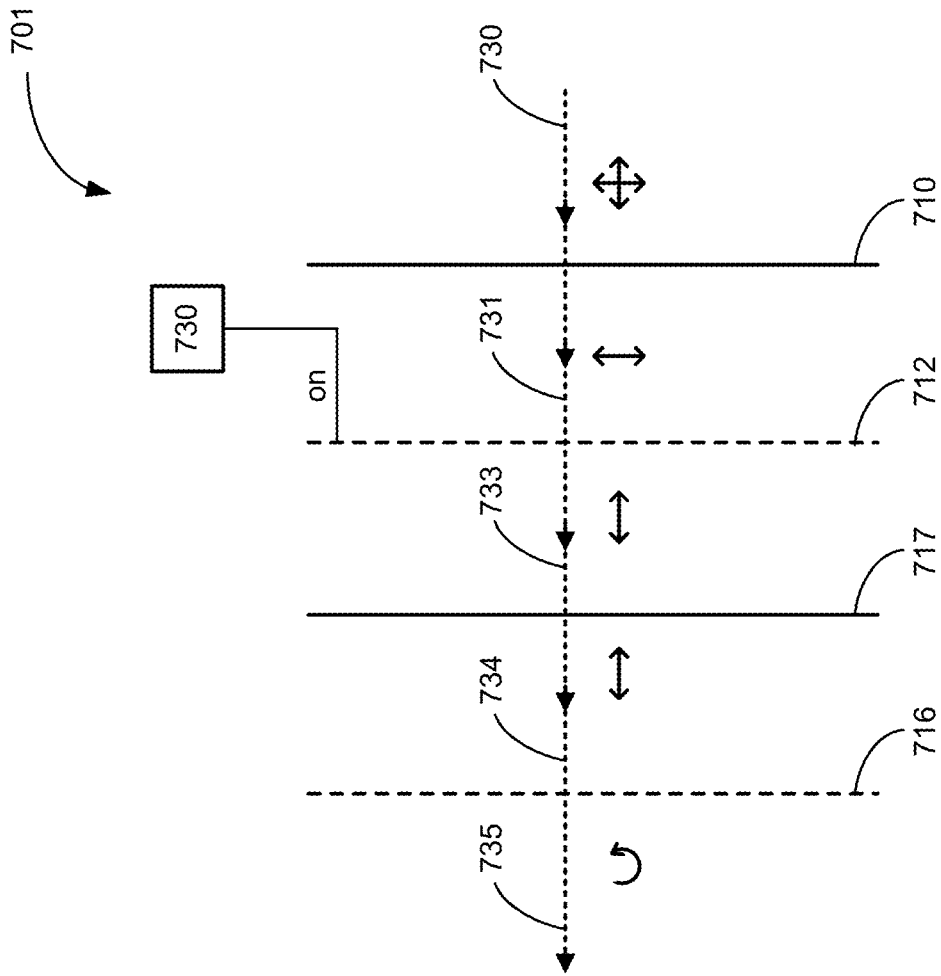

FIGS. 7C and 7D illustrate switchable window in accordance with some embodiments. Switchable window 701 (corresponding to switchable window 414) includes a first polarizer 710, a switchable optical retarder 712, a polarizer 717, an optical retarder 716, and controller 730 coupled to switchable optical retarder 712. Controller 730 is configured to be able to turn switchable optical retarder 712 "on" or "off". Operation of switchable optical retarder 712 has been described above with respect to switchable window 700 and is omitted here for brevity.

Referring to FIG. 7C, first polarizer 710 is configured to receive external light (e.g., ray 730). Often times, as shown, external light is unpolarized. First polarizer 710 is configured to transmit at least a portion of unpolarized external light having the fourth polarization as ray 731. When switchable optical retarder 712 is "off", ray 731 having the fourth polarization is transmitted through switchable optical retarder 712 as ray 732. Polarizer 717 is configured to block (e.g., absorb or reflect) light having the fourth polarization (e.g., ray 732). Thus, ray 732 is not transmitted through polarizer 717 and switchable window 701 has blocked external light from being transmitted from the outside environment into the housing or interior space of display device 400.

In some embodiments, first polarizer 710 and polarizer 717 are linear polarizers. As shown in FIGS. 7C and 7D, first polarizer 710 is configured to transmit light having the fourth polarization and polarizer 717 is configured to transmit light having the second polarization orthogonal to the fourth polarization. In some embodiments, optical retarder 716 is a quarter wave plate.

Referring to FIG. 7D, first polarizer 710 is configured to receive external light (e.g., ray 730). First polarizer 710 is configured to transmit at least a portion of unpolarized external light having the fourth polarization as ray 731. When switchable optical retarder 712 is "on", light is converted from ray 731 having the fourth polarization to ray 733 having the second polarization. Polarizer 714 is configured to transmit ray 733 having the second polarization as ray 734. Optical retarder 716 is configured to convert ray 734 the second polarization to ray 735 having the third polarization. Thus, at least half of the external light, having the third polarization, is transmitted from the outside environment, through switchable window 701, and into the housing or interior space of display device 400.

Figure 7E:
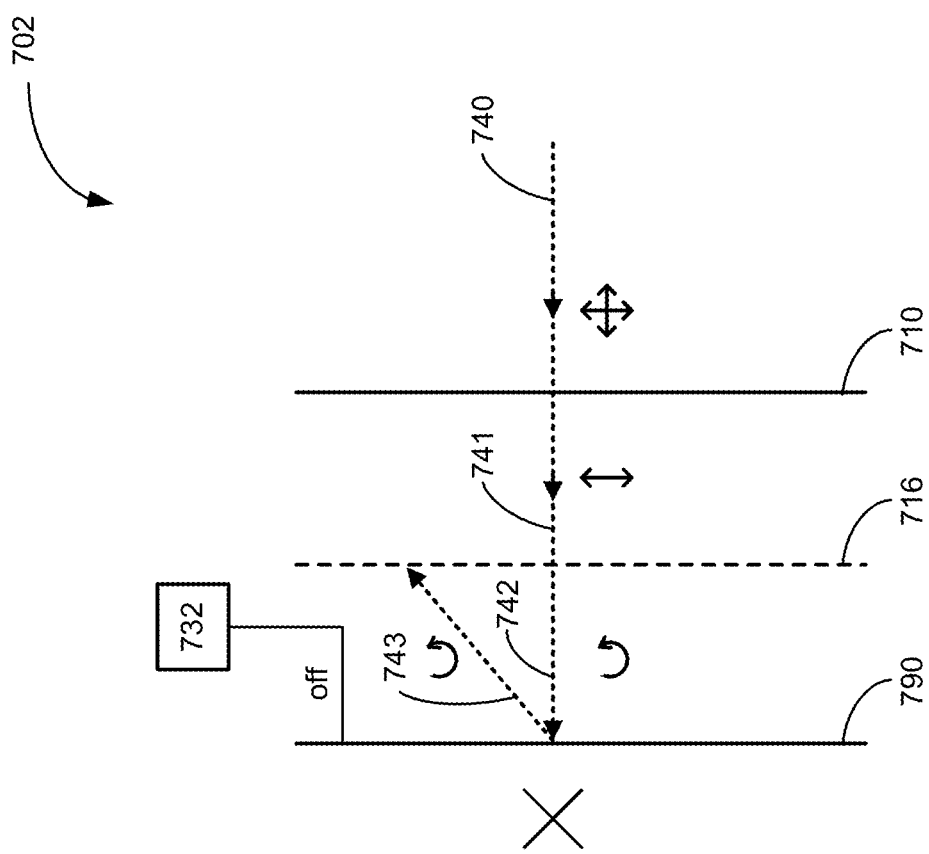
Figure 7F:
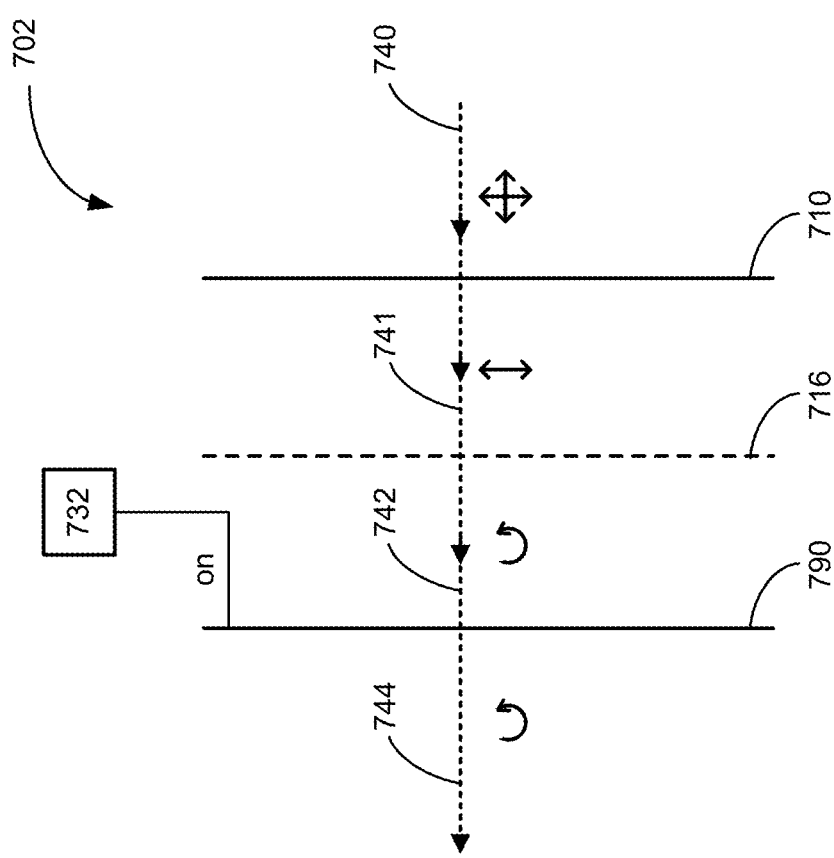

FIGS. 7E and 7F illustrate switchable window in accordance with some embodiments. Switchable window 702 (corresponding to switchable window 414) includes a first polarizer 710, an optical retarder 716, a polarization volume hologram (also called herein PVH) 740, and controller 732 coupled to PVH 790. Controller 732 is configured to be able to turn PVH 790 "on" or "off". PVH 790 is configured to reflect light having the third polarization when it is "on" and to transmit light, regardless of polarization, when it is "off" (e.g., PVH 790 acts like a transparent substrate when it is "off").

A PVH is an optical component that has optical properties including polarization selectivity, wavelength selectivity, and angular selectivity. PVH optical components are typically thinner and lighter than conventional optical components and/or assemblies of optical components with similar performance features, replacing conventional optical components and/or assemblies in head-mounted displays with PVH elements can reduce the size and weight of the head-mounted displays. PVH are designed to be polarization selective. When handedness of circularly polarized light is along the helical axis of a helical structure, the PVH interacts with the circularly polarized light and changes the direction of the light (e.g., focuses, defocuses, reflects, or refracts the light). While interacting with the light having circularly polarized light along the helical axis, a transmissive PVH changes the polarization of the light (e.g., from a right-handed circularly polarized (RCP) light to a left-handed circularly polarized (LCP) light, or vice versa) whereas a reflective PVH does not change the polarization (e.g., RCP light is reflected as RCP light). In contrast, a PVH transmits light with opposite circular polarization without changing its direction or polarization. For example, a transmissive PVH changes polarization of RCP light to LCP light and simultaneously focuses, defocuses, and/or steers (e.g. by refraction or diffraction) the light while transmitting LCP light without changing its polarization or direction. In some embodiments, in addition to being selective based on circular polarization of light, a PVH lens is also wavelength selective and/or selective based on incident angle of the light. Optical properties of the PVH optical component (e.g., optical power, magnification, reflection, and/or refraction) are based on the structure of the photopolymers in the PVH such a helical axis and/or a helical pitch of the photopolymers.

Referring to FIG. 7E, first polarizer 710 is configured to receive external light (e.g., ray 740). First polarizer 710 is configured to transmit at least a portion of unpolarized external light having the fourth polarization as ray 741. Optical retarder 716 is configured to convert ray 741 having the fourth polarization to ray 742 having the third polarization. When PVH 790 is "off", ray 742 having the third polarization is blocked (e.g., reflected, refracted, diffracted) by PVH 790 (e.g., ray 743). Thus, light is not transmitted through PVH 790 and switchable window 702 has blocked external light (e.g., ray 740) from being transmitted from the outside environment into the housing or interior space of display device 400.

Referring to FIG. 7F, first polarizer 710 is configured to receive external light (e.g., ray 740). First polarizer 710 is configured to transmit at least a portion of unpolarized external light having the fourth polarization as ray 741. Optical retarder 716 is configured to convert ray 741 having the fourth polarization to ray 742 having the first polarization. When PVH 790 is "on", ray 742 having the third polarization is transmitted through PVH 790 as ray 744. Thus, light (e.g., ray 744) having the third polarization is transmitted through PVH 790 and switchable window 702 has transmitted at least half of the external light (e.g., ray 740) from the outside environment into the housing or interior space of display device 400.

FIGS. 7G-7J show a switchable window in accordance with some embodiments. Switchable window 703 (corresponding to switchable window 414) includes a first PVH 792, a second PVH 794, a first controller 734 coupled to PVH 792, and a second controller 736 coupled to second PVH 794. First controller 734 is configured to be able to turn first PVH 792 "on" or "off" and second controller 736 is configured to be able to turn second PVH 794 "on" or "off". First PVH 792 is configured to reflect light having the first polarization when it is "on" and to transmit light, regardless of polarization, when it is "off" (e.g., first PVH 792 acts like a transparent substrate when it is "off"). Second PVH 794 is configured to reflect light having the third polarization when it is "on" and to transmit light, regardless of polarization, when it is "off" (e.g., second PVH 794 acts like a transparent substrate when it is "off").

Figure 7G:
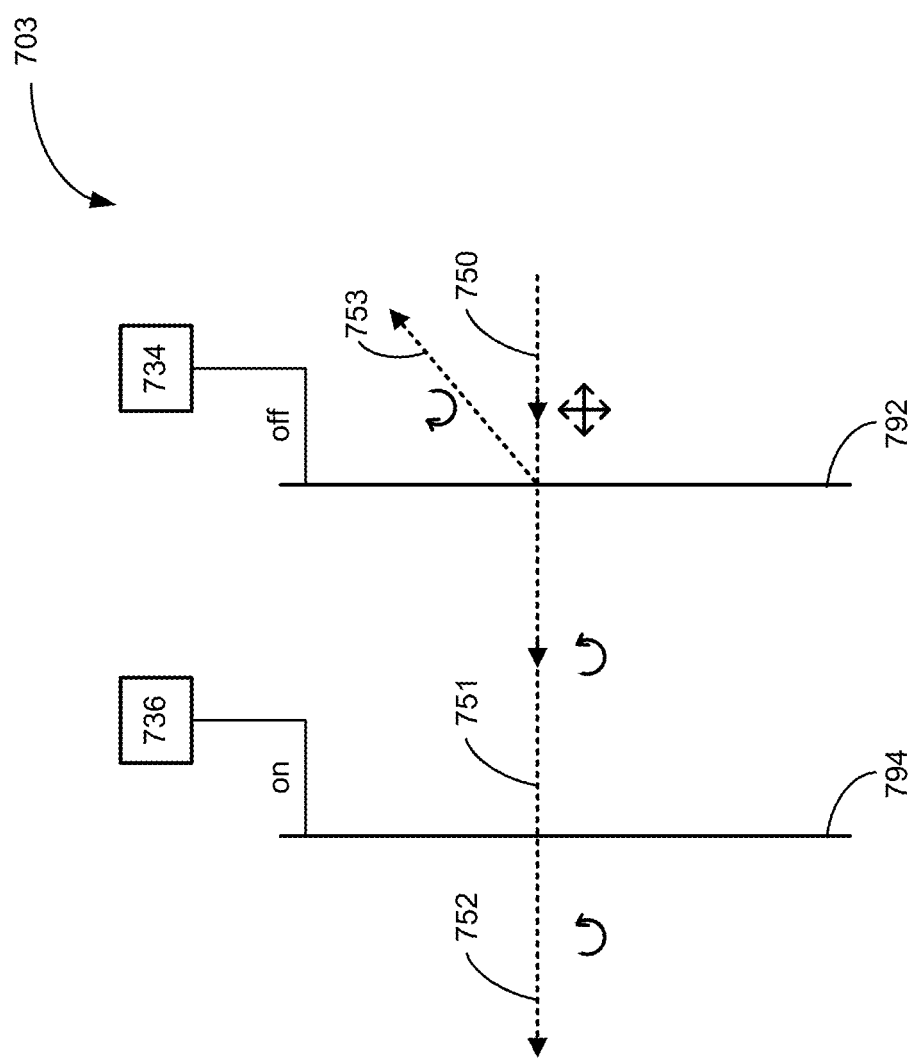

Referring to FIG. 7G, first PVH 792 is configured to receive external light (e.g., ray 750). In the "off" state, first PVH 792 is configured to reflect light (e.g., ray 753) having the first polarization and transmit a portion of ray 750 having the third polarization as ray 751. Second PVH 794 is configured to receive the portion of ray 751 having the third polarization. In the "on" state, second PVH 794 is configured to transmit light, regardless of polarization. Thus, ray 751 having the third polarization is transmitted through second PVH 794 as ray 752 and switchable window 703 has transmitted at least half of the external light from the outside environment into the housing or interior space of display device 400.

Figure 7H:
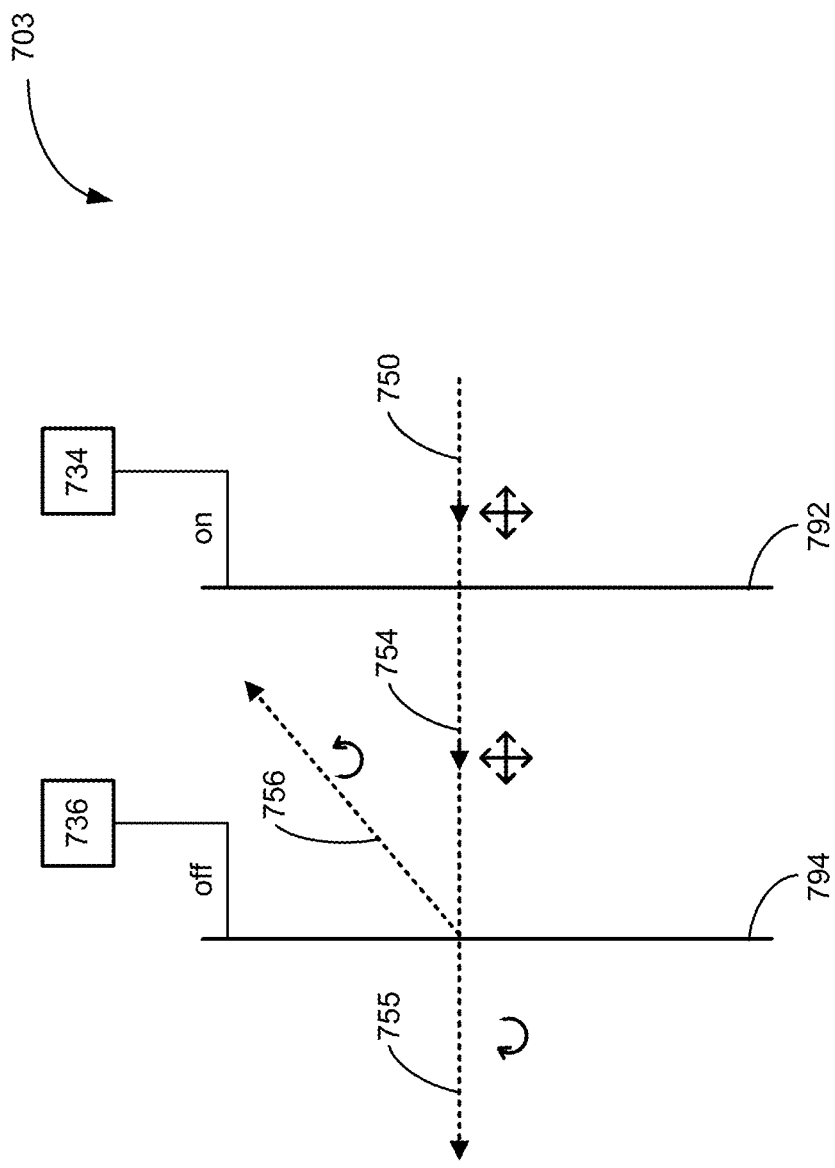

Referring to FIG. 7H, first PVH 792 is configured to receive external light (e.g., ray 750). In the "on" state, first PVH 792 is configured transmit light, regardless of polarization. Second PVH 794 is configured to receive ray 750, transmitted through first PVH 792 as ray 754. In the "off" state, second PVH 794 is configured to reflect light having the third polarization (e.g., ray 756) and transmit a portion of ray 754 having the first polarization. Thus, the portion of ray 754 having the first polarization is transmitted through second PVH 794 as ray 755 and switchable window 703 has transmitted at least half of the external light from the outside environment into the housing or interior space of display device 400.

Referring to FIG. 7I, first PVH 792 is configured to receive external light (e.g., ray 750). In the "on" state, first PVH 792 is configured transmit light (e.g., ray 754), regardless of polarization. Second PVH 794 is configured to receive ray 754, transmitted through first PVH 792. In the "on" state, second PVH 794 is configured transmit light, regardless of polarization. Thus, ray 754 is transmitted through second PVH 794 as ray 757 and switchable window 703 has transmitted external light from the outside environment into the housing or interior space of display device 400. In the configuration shown in FIG. 7I and described above, the polarization of ray 720 is not changed by switchable window 703.

Figure 7J:
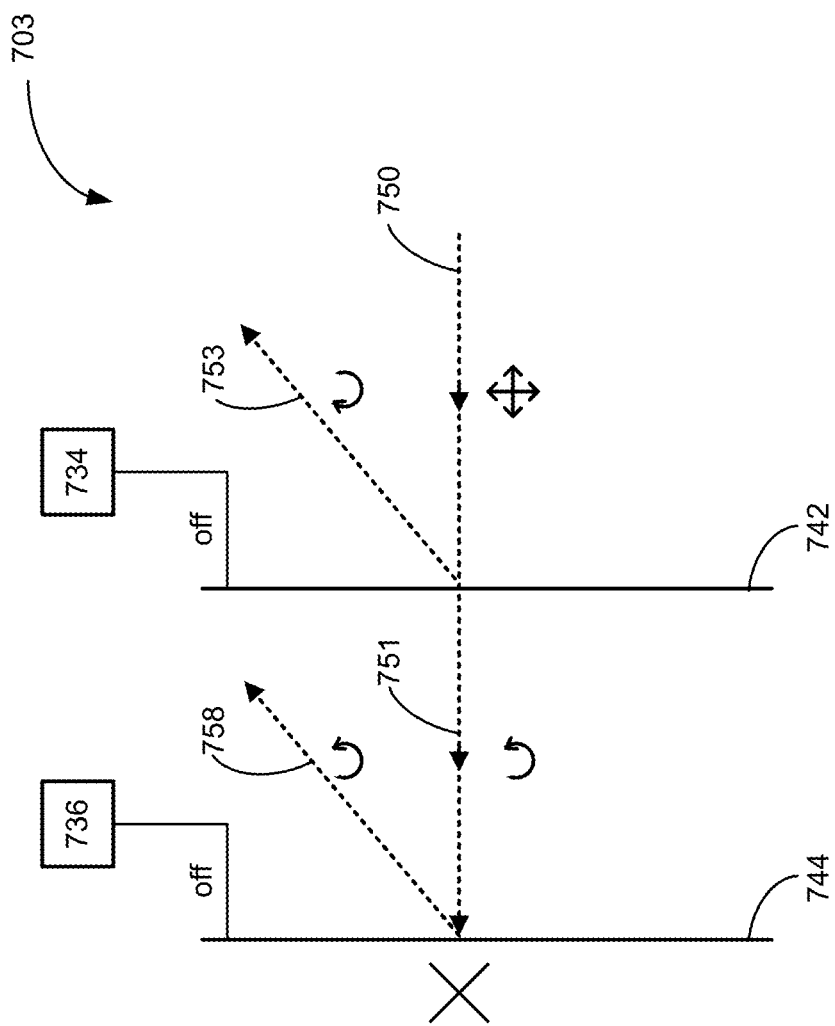

Referring to FIG. 7J, first PVH 792 is configured to receive external light (e.g., ray 750). In the "off" state, first PVH 792 is configured to reflect light (e.g., ray 753) having the first polarization and transmit a portion of ray 750 having the third polarization as ray 751. Second PVH 794 is configured to receive the portion of ray 751 having the third polarization. In the "off" state, second PVH 794 is configured to reflect ray 751 having the third polarization. Thus, ray 751 is not transmitted through second PVH 794 and switchable window 703 has blocked external light from being transmitted from the outside environment into the housing or interior space of display device 400.

In some embodiments, the switchable window (e.g., switchable window 700) includes one or more polarizers (e.g., polarizer 710 and 714) and one or more optical retarders (e.g., switchable optical retarder 712 and optical retarder 716) in an optical path of the received ambient light (e.g., ray 720). The one or more optical retarders includes a switchable optical retarder (e.g., switchable optical retarder 712) configured to be in an active state in the first mode and in an inactive state in the second mode (e.g., switchable optical retarder 712 is "on" when display device 400 is in the normal mode and switchable optical retarder 712 is "off" when display device 400 is in the see-through mode). The switchable window is configured to output at least a portion of ambient light, having a third polarization, when the switchable optical retarder is in the inactive state and the switchable window is configured to block ambient light when the switchable optical retarder is in the active state (e.g., switchable window 700 is configured to transmit at least a portion of ray 720, having the third polarization when switchable optical retarder 712 is "off" and switchable window 700 is configured to block ray 720 from transmitting through switchable window 700 when switchable optical retarder 712 is "on.")

In some embodiments, the switchable window (e.g., switchable window 701) includes one or more polarizers (e.g., polarizer 710 and 717) and one or more optical retarders (e.g., switchable optical retarder 712 and optical retarder 716) in an optical path of the received ambient light (e.g., ray 720). The one or more optical retarders includes a switchable optical retarder (e.g., switchable optical retarder 712) configured to be in an inactive state in the first mode and in an active state in the second mode (e.g., switchable optical retarder 712 is "off" when display device 400 is in the normal mode and switchable optical retarder 712 is "on" when display device 400 is in the see-through mode). The switchable window is configured to output at least a portion of ambient light, having a third polarization, when the switchable optical retarder is in the active state and the switchable window is configured to block ambient light when the switchable optical retarder is in the inactive state (e.g., switchable window 700 is configured to transmit at least a portion of ray 720, having the third polarization when switchable optical retarder 712 is "on" and switchable window 700 is configured to block ray 720 from transmitting through switchable window 700 when switchable optical retarder 712 is "off.")

In some embodiments, the switchable window (e.g., switchable window 702 or switchable window 703) includes one or more polarization volume holograms (e.g., PVH 790, 742, and/or 744) in an optical path of the received ambient light (e.g., ray 730), each polarization volume hologram of the one or more polarization volume holograms is switchable between an active state and an inactive state.

In some embodiments, the one or more polarization volume holograms includes a polarization volume hologram, switchable between the inactive state in the first mode and the active state in the second mode (e.g., switchable window 702 includes PVH 790 and PVH 790 is "off" when display device 400 is in the normal mode and PVH 790 is "on" when display device 400 is in the see-through mode).

In some embodiments, the one or more polarization volume holograms includes a first polarization volume hologram and a second polarization volume hologram (e.g., switchable window 703 includes PVH 792 and 744). The first polarization volume hologram and the second polarization are in the inactive state in the first mode and at least one of the first polarization volume hologram or the second polarization is in the active state in the second mode (e.g., PVH 792 and 744 are "off" when display device 400 is in the normal mode and at least one of PVH 792 and 744 is "on" when display device 400 is in the see-through mode).

In some embodiments, the display device includes an eye-tracking module configured to detect a gaze direction of the eye of the user and to set the display device in one of the first mode or the second mode based on the gaze direction of the eye of the user (e.g., eye tracking module 217 is configured to detect a gaze direction of the user's eyes 340, and based on the detected gaze direction, eye tracking module 217 is configured to set display device 400 in either the normal mode or the see-through mode).

Figure 8:
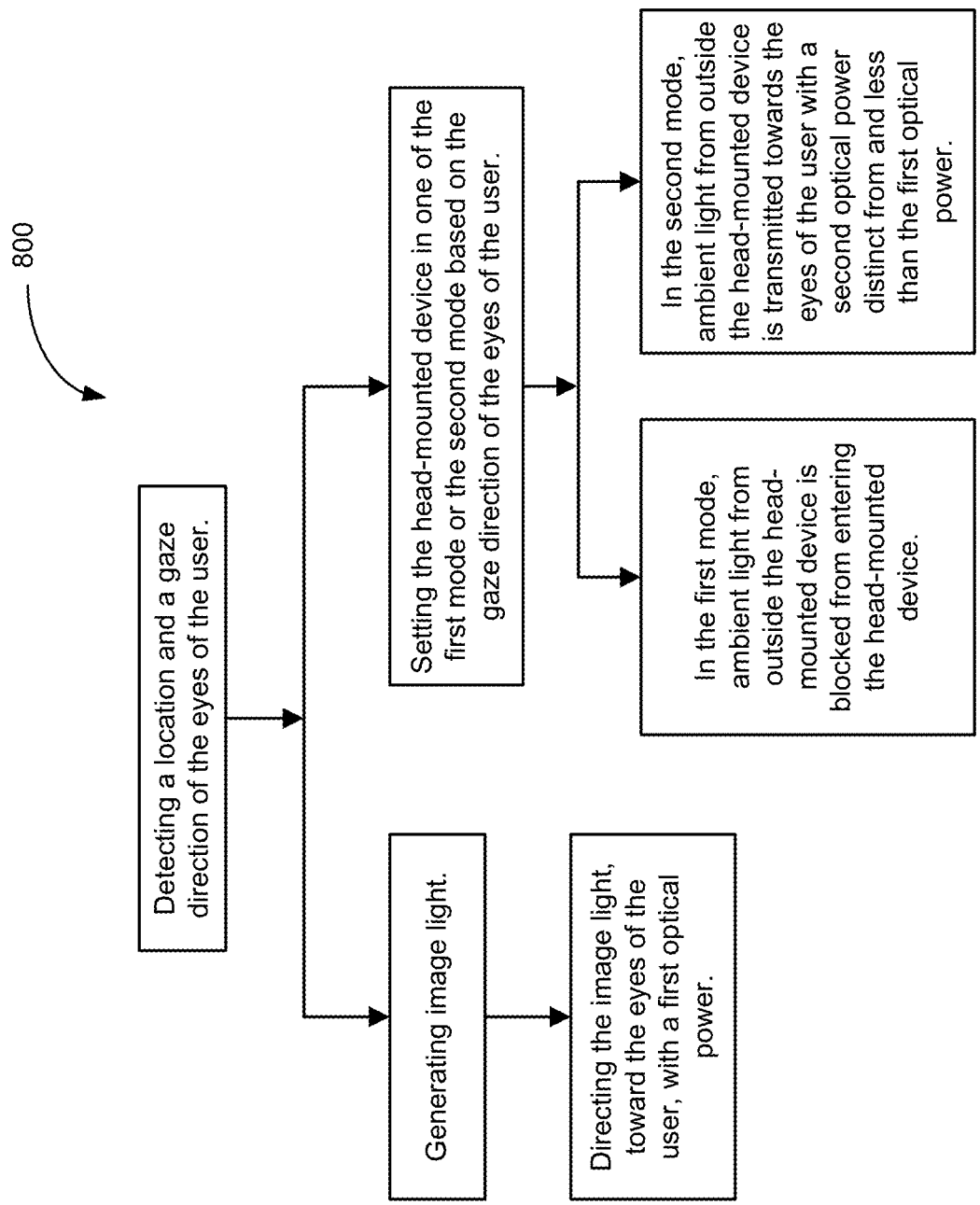
FIG. 8 illustrates a method of operating a display device in accordance with some embodiments.

FIG. 8 illustrates a method of operating a display device in accordance with some embodiments.

In accordance with some embodiments, a method of operating a display device (e.g., display device 400), mounted near the eyes (e.g., eye 340) of a user and operable in either one of a first mode eyes (e.g., normal mode) and a second mode eyes (e.g., see-through mode), includes detecting a location and a gaze direction of the eyes of the user; generating image light eyes (e.g., ray 420); directing the image light toward the eyes of the user with a first optical power; and setting the display device in one of the first mode or the second mode based on the gaze direction of the eyes of the user. In the first mode, ambient light (e.g., ray 422 and 424) from outside the display device is blocked from entering the display device. In the second mode, ambient light from outside the display device is transmitted towards the eyes of the user with a second optical power distinct from and less than the first optical power.

In some embodiments, the method further includes setting the display device in the first mode when the gaze direction of the eyes of the user is toward the emission surface and the display device is set in the second mode when the gaze direction of the eyes of the user is away from the emission surface (e.g., display device 400 is set in the normal mode when the gaze direction of the user's eyes 340 is toward emission surface 410 and display device 400 is set in the see-through mode when the gaze direction of the user's eyes 340 is away from emission surface 410).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device mountable near an eye of a user and operable in either one of a first mode and a second mode, comprising:
    an emission surface configured to output image light;
    a switchable window disposed in a periphery of the display device, external to the emission surface, and configurable to block ambient light from outside the display device in the first mode and to transmit ambient light in the second mode;
    an optical assembly having a first region configured to receive image light from the emission surface and to direct the image light with a first optical power, and a second region configured to receive the ambient light from the switchable window in the second mode and to allow at least a portion of the received ambient light to pass through with a second optical power distinct from and less than the first optical power.

2. The display device of claim 1, wherein the second region of the optical assembly is configured to transmit light to the eye of the user with reduced optical aberration compared to the first region of the optical assembly.

3. The display device of claim 1, wherein the first optical power corresponds to a non-zero focusing power and the second optical power corresponds to a zero focusing power.

4. The display device of claim 1, wherein the second of the optical assembly is configured to transmit the portion of the received ambient light without change in direction.

5. The display device of claim 1, wherein
    the emission surface has a first edge and a second edge opposite to the first edge;
    the switchable window has a first edge and a second edge opposite to the first edge;
    the optical assembly has a first edge and a second edge opposite to the first edge,
        the first region of the optical assembly is adjacent to the first edge of the optical assembly;
        the second region of the optical assembly is adjacent to the second edge of the optical assembly;
        the first edge of the switchable window is disposed adjacent to the second edge of the emission surface;
        the second edge of the switchable window is disposed adjacent to the second edge of the optical assembly;
        the first edge of the optical assembly is disposed proximate to the first edge of the emission surface.

6. The display device of claim 1, wherein the optical assembly includes a piece of optical material having a first portion in the first region and a second portion in the second region.

7. The display device of claim 1, wherein the optical assembly includes one or more optical components, and at least one optical component in the optical assembly has a first section in the first region and a second section in the second region.

8. The display device of claim 7, wherein the at least one optical component has a respective surface that transitions smoothly and continuously from the first region to the second region.

9. The display device of claim 7, wherein the one or more optical components include:
    a beam splitter;
    a reflector; and
    an optical retarder, wherein
        the optical retarder is located between the beam splitter and the reflector,
        the first section of the beam splitter is configured to output first image light by transmitting at least a portion of the image light,
        the first section of the optical retarder is configured to convert the first image light from a first polarization to a second polarization,
        the first section of the reflector is configured to output a second image light by reflecting the first image light having the second polarization towards the optical retarder and beam splitter,
        the first section of the optical retarder is further configured to convert the second image light from the second polarization to the first polarization,
        the first section of the beam splitter is configured to receive the second image light in the first polarization, and to output a third image light by reflecting at least a portion of the second image light, the third image light having a third polarization that is opposite to the first polarization,
the first section of the optical retarder is further configured to convert the third image light from the third polarization to a fourth polarization that is orthogonal to the second polarization, and
the first section of the reflector is configured to transmit at least a portion of the third image light in the fourth polarization.

10. The display device of claim 9, wherein
the second section of the beam splitter is configured to transmit at least a first portion of the received ambient light;
the second section of the optical retarder is configured to convert the first portion of the received ambient light from a third polarization a fourth polarization; and
the second section of the reflector is configured to transmit a second portion of the received ambient light having the fourth polarization.

11. The display device of claim 1, wherein the second region of the optical assembly is configured to transmit at least the portion of the received ambient light to the eye of the user, and
an optical path of the portion of the received ambient light does not include a fold.

12. The display device of claim 1, wherein the optical assembly is configured to direct at least a portion of the image light from the emission surface to the eye of the user and an optical path of the portion of the image light includes one or more folds.

13. The display device of claim 1, wherein the switchable window includes one or more polarizers and one or more optical retarders in an optical path of the received ambient light, wherein:
the one or more optical retarders include a switchable optical retarder configured to be in an active state in the first mode and in an inactive state in the second mode;
the switchable window is configured to output at least the portion of the received ambient light, having a third polarization, when the switchable optical retarder is in the inactive state; and
the switchable window is configured to block the ambient light when the switchable optical retarder is in the active state.

14. The display device of claim 1, wherein the switchable window includes one or more polarizers and one or more optical retarders in an optical path of the received ambient light, wherein
the one or more optical retarders include a switchable optical retarder configured to be in an inactive state in the first mode and in an active state in the second mode
the switchable window is configured to output at least the portion of ambient light, having a third polarization, when the switchable optical retarder is in the active state, and
the switchable window is configured to block the ambient light when the switchable optical retarder is in the inactive state.

15. The display device of claim 1, wherein:
the switchable window includes one or more polarization volume holograms in an optical path of the received ambient light; and
at least one polarization volume hologram of the one or more polarization volume holograms is switchable between an active state and an inactive state.

16. The display device of claim 15, wherein the one or more polarization volume holograms include a polarization volume hologram, switchable between the inactive state in the first mode and the active state in the second mode.

17. The display device of claim 15, wherein the one or more polarization volume holograms include:
a first polarization volume hologram; and
a second polarization volume hologram, wherein
the first polarization volume hologram and the second polarization volume hologram are in the inactive state in the first mode and
at least one of the first polarization volume hologram or the second polarization volume hologram is in the active state in the second mode.

18. The display device of claim 14, further comprising
an eye-tracking module configured to detect a gaze direction of the eye of the user and to set the display device in one of the first mode or the second mode based on the gaze direction of the eye of the user.

19. The display device of claim 1, wherein the display device is a head-mounted display device.

20. A method of operating a display device mounted near an eye of a user, wherein the display device is operable in either one of a first mode and a second mode, comprising:
detecting a location and a gaze direction of the eye of the user;
outputting image light from an emission surface;
directing the image light, toward the eye of the user, with a first optical power; and
setting the display device in one of the first mode or the second mode based on the gaze direction of the eye of the user, wherein
in the first mode, ambient light from outside the display device is blocked from entering the display device through a periphery of the display device that is external to the emission surface; and
in the second mode, ambient light from outside the display device is transmitted through the periphery of the display device towards the eye of the user with a second optical power distinct from and less than the first optical power.

21. The method of claim 20, wherein the display device is set in the first mode when the gaze direction of the eye of the user is toward the emission surface and the display device is set in the second mode when the gaze direction of the eye of the user is away from the emission surface.

* * * * *

UNITED STATES PATENT AND TRADEMARK OFFICE
CERTIFICATE OF CORRECTION

PATENT NO. : 10,600,352 B1
APPLICATION NO. : 16/209909
DATED : March 24, 2020
INVENTOR(S) : Wheelwright et al.

Page 1 of 1

It is certified that error appears in the above-identified patent and that said Letters Patent is hereby corrected as shown below:

In the Claims

Claim 10, Column 29, Line 16, please delete "polarization a fourth" and insert --polarization to a fourth--.

Signed and Sealed this
Sixteenth Day of June, 2020

Andrei Iancu
*Director of the United States Patent and Trademark Office*